(12) United States Patent
Wexler et al.

(10) Patent No.: US 10,841,476 B2
(45) Date of Patent: Nov. 17, 2020

(54) WEARABLE UNIT FOR SELECTIVELY WITHHOLDING ACTIONS BASED ON RECOGNIZED GESTURES

(71) Applicant: ORCAM TECHNOLOGIES LTD., Jerusalem (IL)

(72) Inventors: Yonatan Wexler, Jerusalem (IL); Amnon Shashua, Mevaseret Zion (IL)

(73) Assignee: OrCam Technologies Ltd., Jerusalem (IL)

( * ) Notice: Subject to any disclaimer, the term of this patent is extended or adjusted under 35 U.S.C. 154(b) by 708 days.

(21) Appl. No.: 14/807,321

(22) Filed: Jul. 23, 2015

(65) Prior Publication Data
US 2016/0026257 A1    Jan. 28, 2016

Related U.S. Application Data

(60) Provisional application No. 62/027,936, filed on Jul. 23, 2014, provisional application No. 62/027,957, filed on Jul. 23, 2014.

(51) Int. Cl.
| | | |
|---|---|---|
| *G06K 9/00* | (2006.01) | |
| *H04N 5/225* | (2006.01) | |

(Continued)

(52) U.S. Cl.
CPC ......... *H04N 5/2259* (2013.01); *G01S 3/7864* (2013.01); *G02B 27/0093* (2013.01);
(Continued)

(58) Field of Classification Search
CPC ......... G02B 27/0093; G06T 7/97; G06T 7/74; G06F 1/188; G06F 1/1686; G06F 3/0304;
(Continued)

(56) References Cited

U.S. PATENT DOCUMENTS 6,115,482 A     9/2000 Sears et al.
8,558,759 B1 *  10/2013 Prada Gomez ......... G06F 3/017
                                                     345/156

(Continued)

FOREIGN PATENT DOCUMENTS

EP          2065871        6/2009

OTHER PUBLICATIONS

Karacs, Kristof et al., "Bionic Eyeglass: An Audio Guide for Visually Impaired," Biomedical Circuits and Systems Conference, 2006, BIOCAS 2006, IEEE, Piscataway, NJ, Nov. 29, 2006. p, 190-193.

(Continued)

*Primary Examiner* — Andrew M Moyer
(74) *Attorney, Agent, or Firm* — Finnegan, Henderson, Farabow, Garrett & Dunner, LLP

(57) ABSTRACT

A wearable apparatus and method are provided for selectively disregarding triggers originating from persons other than a user of the wearable apparatus. The wearable apparatus comprises a wearable image sensor configured to capture image data from an environment of the user of the wearable apparatus. The wearable apparatus also includes at least one processing device programmed to receive the captured image data and identify in the image data a trigger. The trigger is associated with at least one action to be performed by the wearable apparatus. The processing device is also programmed to determine, based on the image data, whether the trigger identified in the image data is associated with a person other than the user of the wearable apparatus, and forgo performance of the at least one action if the trigger identified in the image data is determined to be associated with a person other than the user.

27 Claims, 19 Drawing Sheets

(51) Int. Cl.

| | |
|---|---|
| G06F 1/18 | (2006.01) |
| G06F 16/532 | (2019.01) |
| G06T 7/00 | (2017.01) |
| G06T 7/73 | (2017.01) |
| G06K 9/62 | (2006.01) |
| G06F 1/16 | (2006.01) |
| G06F 3/03 | (2006.01) |
| G02B 27/00 | (2006.01) |
| G02B 27/01 | (2006.01) |
| G06F 3/01 | (2006.01) |
| G06Q 30/02 | (2012.01) |
| H04N 5/232 | (2006.01) |
| H04N 7/18 | (2006.01) |
| G06F 3/00 | (2006.01) |
| G06F 3/038 | (2013.01) |
| H04N 5/235 | (2006.01) |
| G06T 7/20 | (2017.01) |
| H04N 5/44 | (2011.01) |
| G01S 3/786 | (2006.01) |
| H04N 1/21 | (2006.01) |
| G06F 16/53 | (2019.01) |
| G06F 16/51 | (2019.01) |

(52) U.S. Cl.
CPC ........... *G02B 27/017* (2013.01); *G06F 1/163* (2013.01); *G06F 1/1686* (2013.01); *G06F 1/18* (2013.01); *G06F 1/188* (2013.01); *G06F 3/005* (2013.01); *G06F 3/011* (2013.01); *G06F 3/012* (2013.01); *G06F 3/017* (2013.01); *G06F 3/0304* (2013.01); *G06F 3/038* (2013.01); *G06F 16/51* (2019.01); *G06F 16/53* (2019.01); *G06F 16/532* (2019.01); *G06K 9/00201* (2013.01); *G06K 9/00208* (2013.01); *G06K 9/00221* (2013.01); *G06K 9/00288* (2013.01); *G06K 9/00335* (2013.01); *G06K 9/00624* (2013.01); *G06K 9/00671* (2013.01); *G06K 9/00677* (2013.01); *G06K 9/00718* (2013.01); *G06K 9/6262* (2013.01); *G06Q 30/0246* (2013.01); *G06Q 30/0257* (2013.01); *G06Q 30/0267* (2013.01); *G06Q 30/0269* (2013.01); *G06T 7/20* (2013.01); *G06T 7/74* (2017.01); *G06T 7/97* (2017.01); *H04N 1/2112* (2013.01); *H04N 5/2251* (2013.01); *H04N 5/2252* (2013.01); *H04N 5/2254* (2013.01); *H04N 5/2257* (2013.01); *H04N 5/2258* (2013.01); *H04N 5/2353* (2013.01); *H04N 5/23206* (2013.01); *H04N 5/23216* (2013.01); *H04N 5/23219* (2013.01); *H04N 5/23229* (2013.01); *H04N 5/23245* (2013.01); *H04N 5/23258* (2013.01); *H04N 5/44* (2013.01); *H04N 7/183* (2013.01); *H04N 7/185* (2013.01); *G02B 2027/014* (2013.01); *G02B 2027/0138* (2013.01); *G02B 2027/0178* (2013.01); *G02B 2027/0187* (2013.01); *G06F 2203/011* (2013.01); *G06K 2209/21* (2013.01); *G06K 2209/25* (2013.01); *G06T 2207/10004* (2013.01); *G06T 2207/10016* (2013.01); *G06T 2207/30232* (2013.01)

(58) Field of Classification Search
CPC ............ G06F 17/30277; H04N 5/2259; H04N 5/2254; H04N 5/2257; H04N 5/23258; H04N 5/2258; G06K 9/00677; G06K 9/6262
USPC ......................................................... 382/103
See application file for complete search history.

(56) References Cited

U.S. PATENT DOCUMENTS

| | | | |
|---|---|---|---|
| 2002/0057383 A1* | 5/2002 | Iwamura ................ | G08C 23/00 348/734 |
| 2005/0208457 A1 | 9/2005 | Fink et al. | |
| 2006/0017810 A1 | 1/2006 | Kurzweil et al. | |
| 2008/0170749 A1 | 7/2008 | Albertson et al. | |
| 2011/0246329 A1 | 10/2011 | Geisner et al. | |
| 2011/0299774 A1* | 12/2011 | Manders ................ | G06F 3/017 382/168 |
| 2012/0212593 A1* | 8/2012 | Na'aman ............. | G09B 21/006 348/62 |
| 2013/0107026 A1* | 5/2013 | Kim ........................ | G06F 3/017 348/77 |
| 2013/0169536 A1 | 7/2013 | Wexler et al. | |
| 2013/0250078 A1 | 9/2013 | Levy | |
| 2013/0271584 A1 | 10/2013 | Wexler et al. | |
| 2014/0172231 A1* | 6/2014 | Terada ................... | G06F 3/005 701/36 |
| 2014/0267649 A1 | 9/2014 | Wexler et al. | |
| 2015/0054742 A1* | 2/2015 | Imoto ..................... | G06F 3/017 345/158 |

OTHER PUBLICATIONS

Lai, Chin-Lun et al., "An Integrated Portable Vision Assistant Agency for the Visual Impaired People," 2009 IEEE International Conference on Control and Automation, Christchurch, New Zealand, Dec. 9-11, 2009 (6 pages).

* cited by examiner

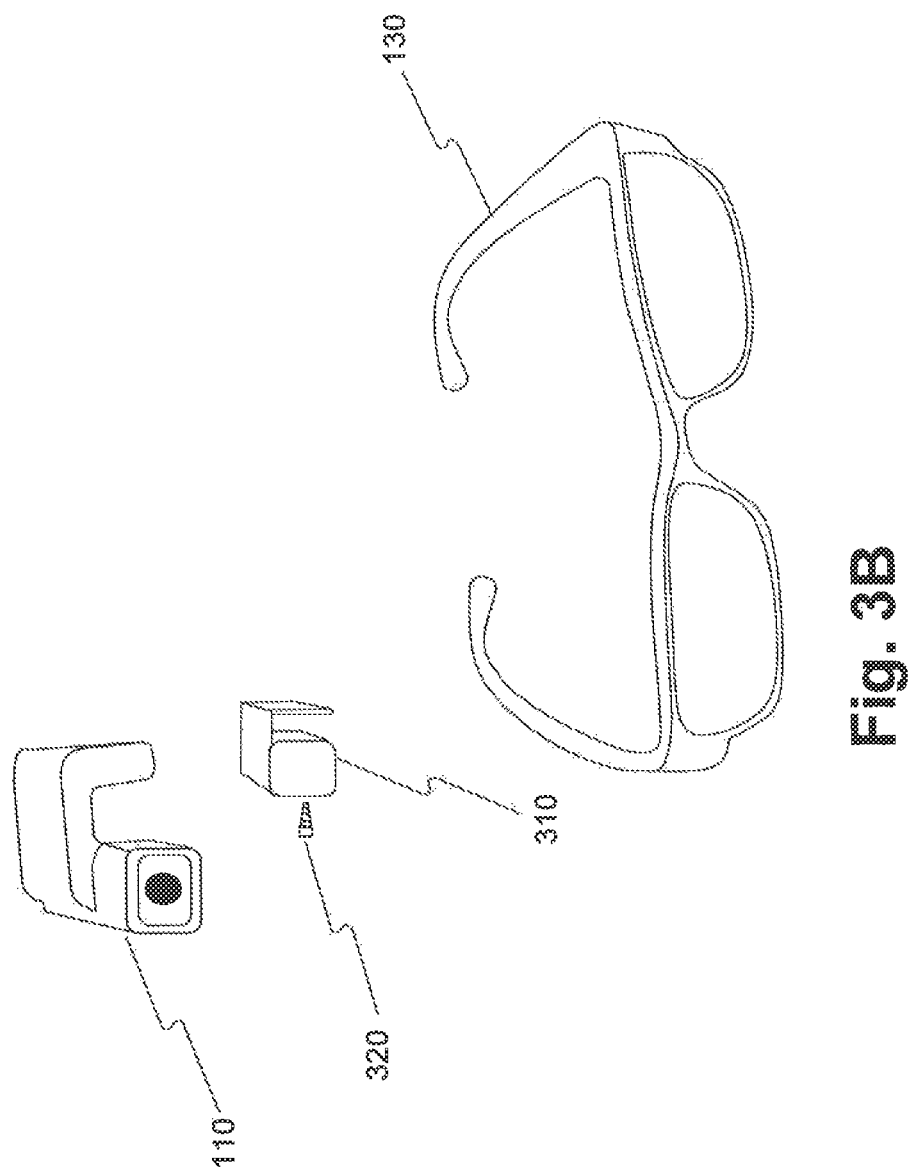

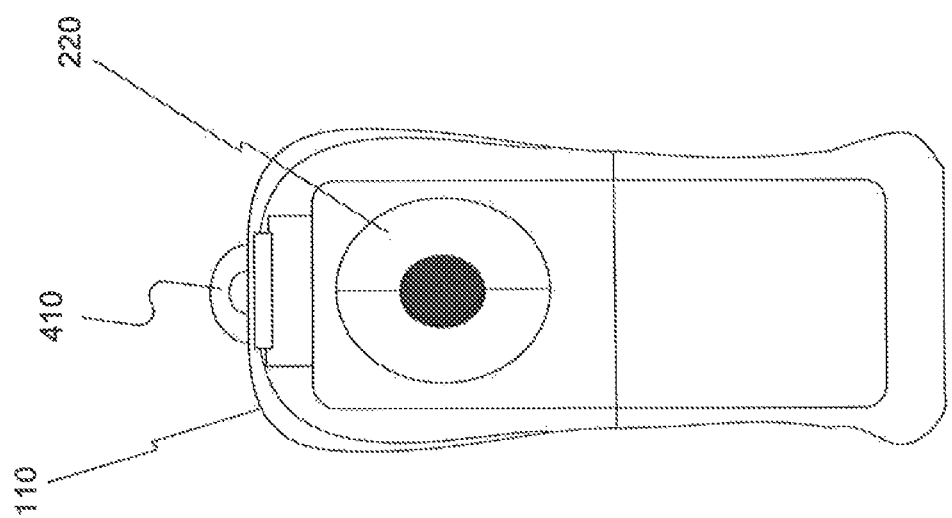

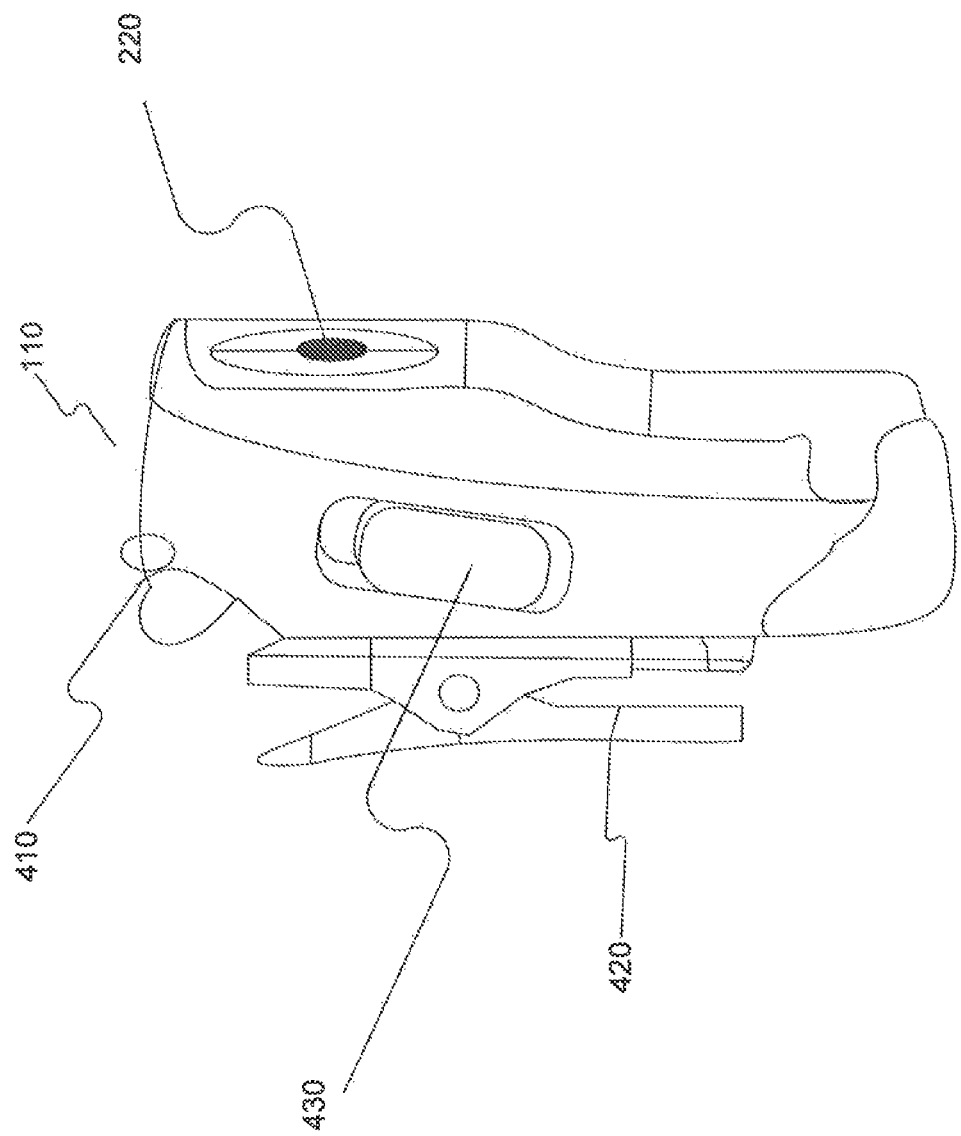

WEARABLE UNIT FOR SELECTIVELY WITHHOLDING ACTIONS BASED ON RECOGNIZED GESTURES

CROSS REFERENCES TO RELATED APPLICATIONS

This application claims the benefit of priority of U.S. Provisional Patent Application No. 62/027,936, filed on Jul. 23, 2014, and U.S. Provisional Patent Application No. 62/027,957, filed on Jul. 23, 2014, all of which are incorporated herein by reference in their entirety.

BACKGROUND

Technical Field

This disclosure generally relates to devices and methods for capturing and processing images from an environment of a user. More particularly, this disclosure relates to devices and methods for selectively withholding actions based on recognized gestures.

Background Information

Today, technological advancements make it possible for wearable devices to automatically capture images and store information that is associated with the captured images. Certain devices have been used to digitally record aspects and personal experiences of one's life in an exercise typically called "lifelogging." Some individuals log their life so they can retrieve moments from past activities, for example, social events, trips, etc. Lifelogging may also have significant benefits in other fields (e.g., business, fitness and healthcare, and social research). Lifelogging devices, while useful for tracking daily activities, may be improved with capability to enhance one's interaction in his environment with feedback and other advanced functionality based on the analysis of captured image data.

Even though users can capture images with their smartphones and some smartphone applications can process the captured images, smartphones may not be the best platform for serving as lifelogging apparatuses in view of their size and design. Lifelogging apparatuses should be small and light, so they can be easily worn. Moreover, with improvements in image capture devices, including wearable apparatuses, additional functionality may be provided to assist users in navigating in and around an environment. Therefore, there is a need for apparatuses and methods for automatically capturing and processing images in a manner that provides useful information to users of the apparatuses. For example, there is a need to enable context specific determinations based on the automatic capturing and processing of images to interpret certain gestures of the user or others, and to provide useful feedback or perform a desired action. Furthermore, there is a need to distinguish between a user's gesture and the gesture of others to determine the appropriate action.

SUMMARY

Embodiments consistent with the present disclosure provide an apparatus and methods for automatically capturing and processing images from an environment of a user and disregarding hand-related triggers of persons other than a user of a wearable apparatus.

In accordance with a disclosed embodiment, a wearable apparatus is provided for selectively disregarding triggers originating from persons other than a user of the wearable apparatus. The wearable apparatus comprises a wearable image sensor configured to capture image data from an environment of the user of the wearable apparatus. The wearable apparatus also includes at least one processing device programmed to receive the captured image data and identify in the image data a trigger. The trigger is associated with at least one action to be performed by the wearable apparatus. The processing device is also programmed to determine, based on the image data, whether the trigger identified in the image data is associated with a person other than the user of the wearable apparatus, and forgo performance of the at least one action if the trigger identified in the image data is determined to be associated with a person other than the user of the wearable apparatus.

In accordance with another disclosed embodiment, a wearable apparatus is provided for disregarding triggers of persons other than a user of the wearable apparatus. The wearable apparatus includes a wearable image sensor configured to capture image data from an environment of the user of the wearable apparatus. The wearable apparatus also includes at least one processing device programmed to receive the captured image data and identify in the image data a hand-related trigger. The hand-related trigger is associated with at least one action to be performed by the wearable apparatus. The processing device is also programmed to determine, based on the image data, whether the hand-related trigger identified in the image data is associated with at least a portion of a hand belonging to a person other than the user of the wearable apparatus, and forgo performance of the at least one action if the hand-related trigger identified in the image data is determined to be associated with at least a portion of a hand belonging to a person other than the user of the wearable apparatus.

In accordance with another disclosed embodiment, a method is provided for selectively disregarding triggers originating from persons other than a user of a wearable apparatus. The method includes capturing, via a wearable image sensor of the wearable apparatus, image data from an environment of the user of the wearable apparatus. The method includes identifying in the image data a trigger. The trigger is associated with at least one action to be performed by the wearable apparatus. The method further includes determining, based on the image data, whether the trigger identified in the image data is associated with a person other than the user of the wearable apparatus, and forgoing performance of the at least one action if the trigger identified in the image data is determined to be associated with a person other than the user of the wearable apparatus.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 3B is an exploded view of the example of the wearable apparatus shown in FIG. 3A.

FIG. 4A is a schematic illustration of an example of the wearable apparatus shown in FIG. 1B from a first viewpoint.

FIG. 4B is a schematic illustration of the example of the wearable apparatus shown in FIG. 1B from a second viewpoint.

DETAILED DESCRIPTION

Figure 1A:
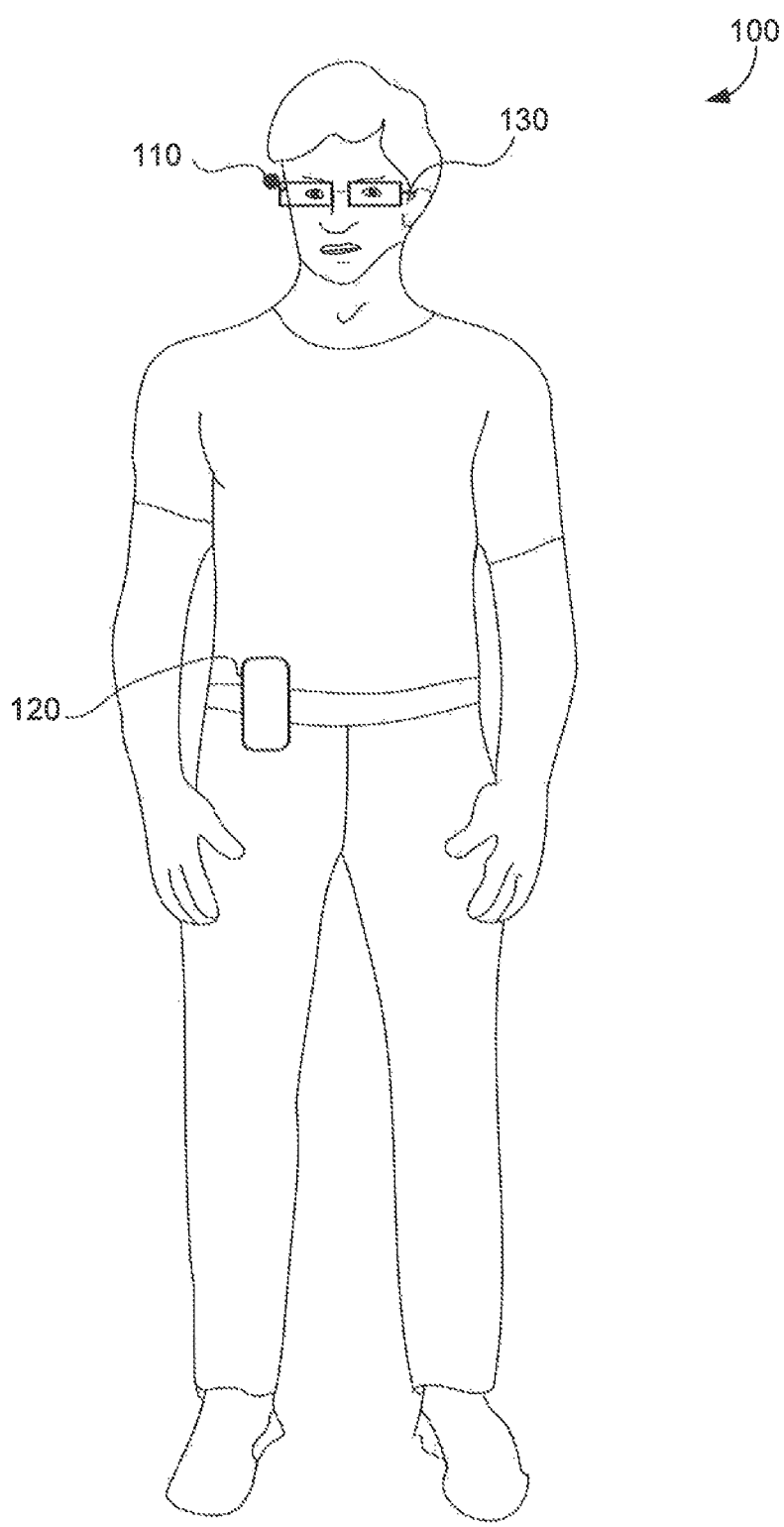
FIG. 1A is a schematic illustration of an example of a user wearing a wearable apparatus according to a disclosed embodiment.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Disclosed embodiments provide wearable apparatuses and methods for capturing and processing images, identifying a trigger in the images, and selectively withholding actions when the trigger is associated with a gesture of a person other than the user. One example of the disclosed embodiments is a wearable apparatus that includes a camera configured to capture real-time image data from an environment of the user. The wearable apparatus may use program instructions to determine when to capture images. Accordingly, the wearable apparatus may automatically capture images from the user's environment based at least on the program instructions. The wearable apparatus also may include a processing unit configured to process the real-time image data and to make real-time decisions about the data and provide real-time feedback to the user. The processing unit may determine, for example, which type of data to store (e.g., video, audio, or still images), which images to store (e.g., avoid storing repetitive images), which image resolution to use (e.g., using high-resolution when capturing a family member), which feedback to provide based on a determined gesture, and so on. Real-time feedback may include, for example, an output that audibly identifies individuals or objects from a distance, reads signboards, determines a value of currency, and/or identifies the state of a traffic light or condition of other environmental situations.

FIG. 1A illustrates a user 100 wearing an apparatus 110 that is physically connected (or integral) to glasses 130, consistent with the disclosed embodiments. Glasses 130 may be prescription glasses, magnifying glasses, non-prescription glasses, safety glasses, sunglasses, etc. Additionally, in some embodiments, glasses 130 may include parts of a frame and earpieces, nosepieces, etc., and one or more lenses. Thus, in some embodiments, glasses 130 may function primarily to support apparatus 110, and/or an augmented reality display device or other optical display device. In some embodiments, apparatus 110 may include an image sensor (not shown in FIG. 1A) for capturing real-time image data of the field-of-view of user 100. The term "image data" includes any form of data retrieved from optical signals in the near-infrared, infrared, visible, and ultraviolet spectrums. The image data may include video clips and/or photographs.

In some embodiments, apparatus 110 may communicate wirelessly or via a wire with a computing device 120. In some embodiments, computing device 120 may include, for example, a smartphone, or a tablet, or a dedicated processing unit, which may be portable (e.g., can be carried in a pocket of user 100). Although shown in FIG. 1A as an external device, in some embodiments, computing device 120 may be provided as part of wearable apparatus 110 or glasses 130, whether integral thereto or mounted thereon. In some embodiments, computing device 120 may be included in an augmented reality display device or optical head mounted display provided integrally or mounted to glasses 130. In other embodiments, computing device 120 may be provided as part of another wearable or portable apparatus of user 100 including a wrist-strap, a multifunctional watch, a button, a clip-on, etc. And in other embodiments, computing device 120 may be provided as part of another system, such as an on-board automobile computing or navigation system. A person skilled in the art can appreciate that different types of computing devices and arrangements of devices may implement the functionality of the disclosed embodiments. Accordingly, in other implementations, computing device 120 may include a Personal Computer (PC), laptop, an Internet server, etc.

Figure 1B:
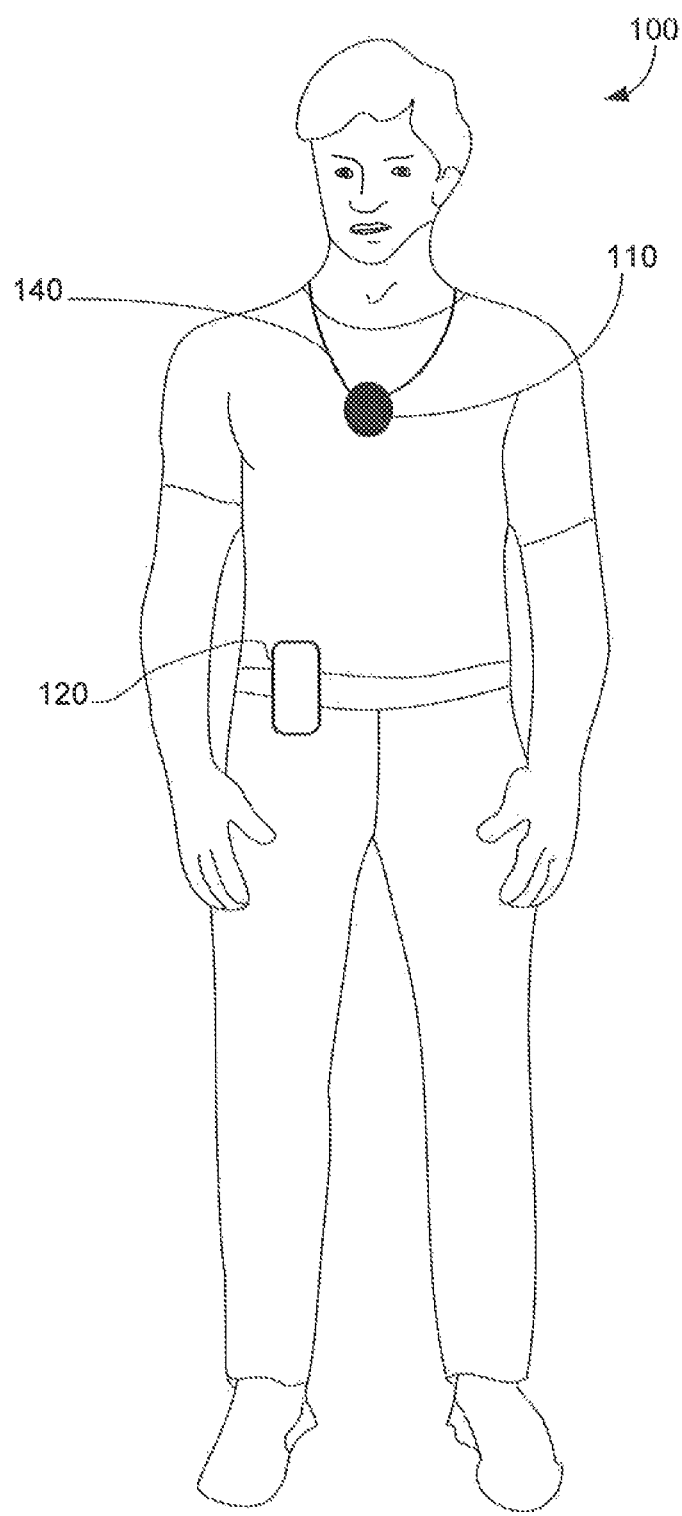
FIG. 1B is a schematic illustration of an example of the user wearing a wearable apparatus according to a disclosed embodiment.

FIG. 1B illustrates user 100 wearing apparatus 110 that is physically connected to a necklace 140, consistent with a disclosed embodiment. Such a configuration of apparatus 110 may be suitable for users that do not wear glasses some or all of the time. In this embodiment, user 100 can easily wear apparatus 110, and take it off.

Figure 1C:
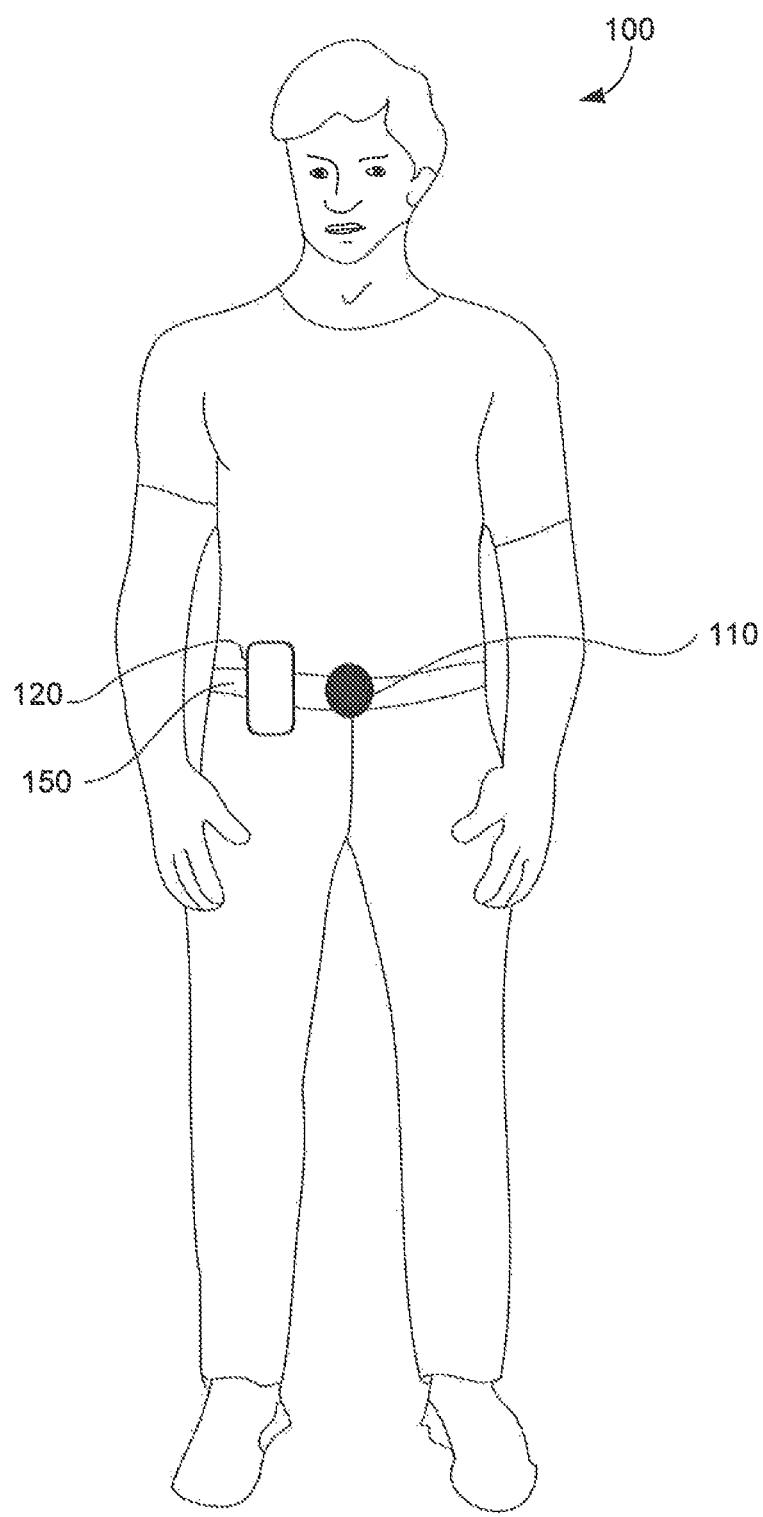
FIG. 1C is a schematic illustration of an example of the user wearing a wearable apparatus according to a disclosed embodiment.

FIG. 1C illustrates user 100 wearing apparatus 110 that is physically connected to a belt 150, consistent with a disclosed embodiment. Such a configuration of apparatus 110 may be designed as a belt buckle. Alternatively, apparatus 110 may include a clip for attaching to various clothing articles, such as belt 150, or a vest, a pocket, a collar, a cap or hat or other portion of a clothing article.

Figure 1D:
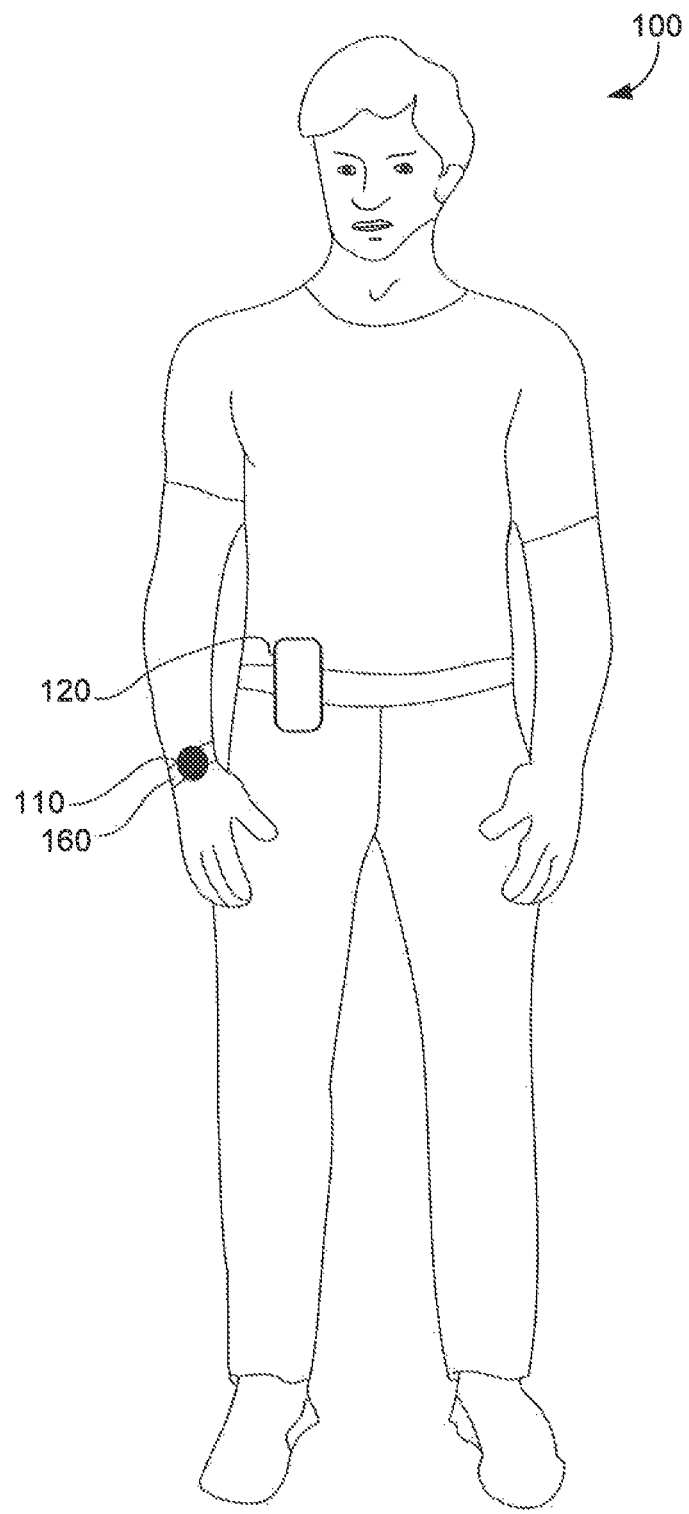
FIG. 1D is a schematic illustration of an example of the user wearing a wearable apparatus according to a disclosed embodiment.

FIG. 1D illustrates user 100 wearing apparatus 110 that is physically connected to a wrist strap 160, consistent with a disclosed embodiment. Although the aiming direction of apparatus 110, according to this embodiment, may not match the field-of-view of user 100, apparatus 110 may include the ability to identify a hand-related trigger based on the tracked eye movement of a user 100 indicating that user 100 is looking in the direction of the wrist strap 160. Wrist strap 160 may also include an accelerometer, a gyroscope, or other sensor for determining movement or orientation of a user's 100 hand for identifying a hand-related trigger.

Figure 2:
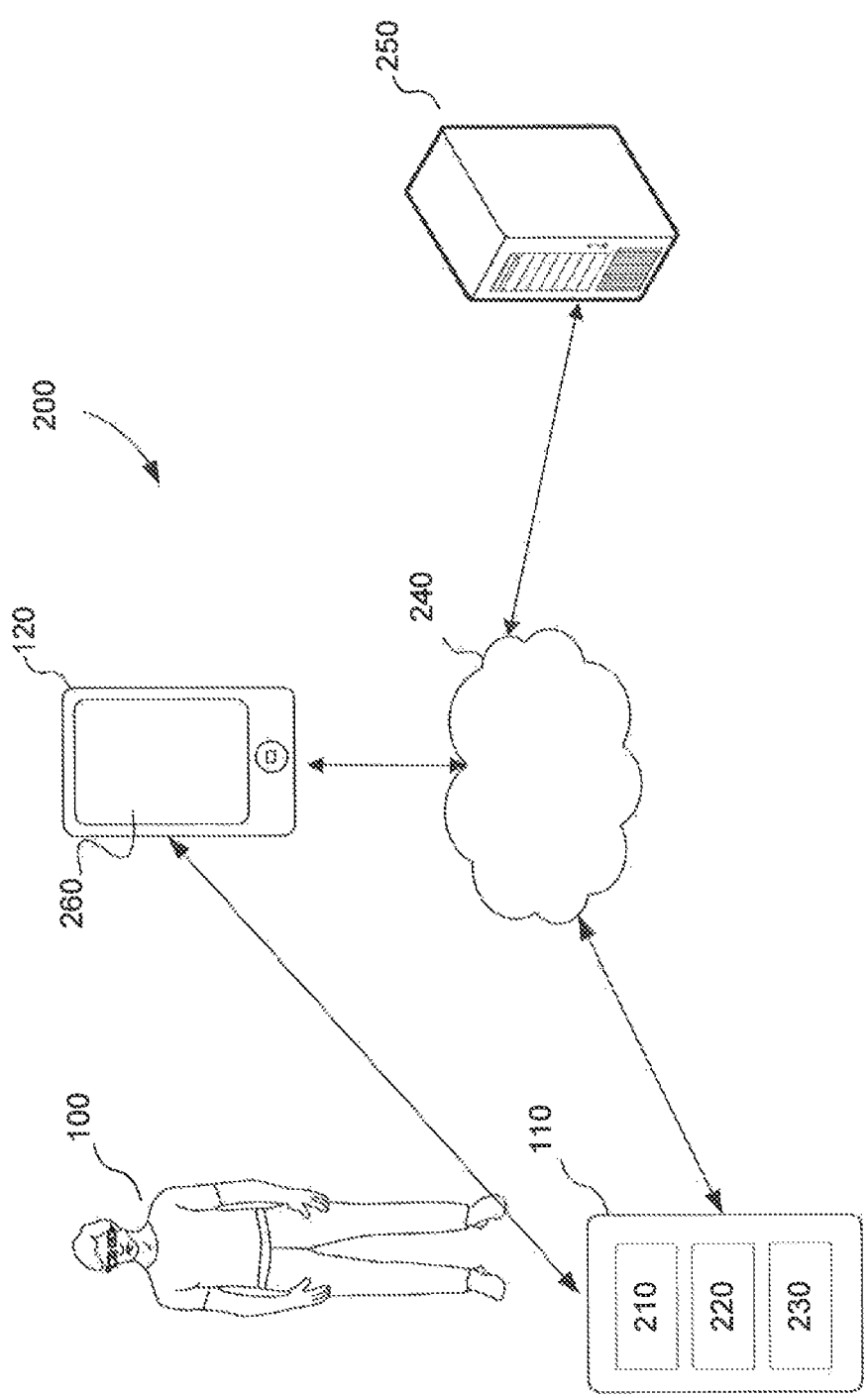
FIG. 2 is a schematic illustration of an example system consistent with the disclosed embodiments.

FIG. 2 is a schematic illustration of an exemplary system 200 including a wearable apparatus 110, worn by user 100, and an optional computing device 120 and/or a server 250 capable of communicating with apparatus 110 via a network 240, consistent with disclosed embodiments. In some embodiments, apparatus 110 may capture and analyze image data, identify a hand-related trigger present in the image data, and perform an action and/or provide feedback to a user 100, based at least in part on the identification of the hand-related trigger. In some embodiments, optional computing device 120 and/or server 250 may provide additional functionality to enhance interactions of user 100 with his or her environment, as described in greater detail below.

According to the disclosed embodiments, apparatus 110 may include an image sensor system 220 for capturing real-time image data of the field-of-view of user 100. In some embodiments, apparatus 110 may also include a processing unit 210 for controlling and performing the disclosed functionality of apparatus 110, such as to control the capture of image data, analyze the image data, and perform an action and/or output a feedback based on a hand-related trigger identified in the image data. According to the disclosed embodiments, a hand-related trigger may include a gesture performed by user 100 involving a portion of a hand of user 100. Further, consistent with some embodiments, a hand-related trigger may include a wrist-related trigger. Additionally, in some embodiments, apparatus 110 may include a feedback outputting unit 230 for producing an output of information to user 100.

As discussed above, apparatus 110 may include an image sensor 220 for capturing image data. The term "image sensor" refers to a device capable of detecting and converting optical signals in the near-infrared, infrared, visible, and ultraviolet spectrums into electrical signals. The electrical signals may be used to form an image or a video stream (i.e. image data) based on the detected signal. The term "image data" includes any form of data retrieved from optical signals in the near-infrared, infrared, visible, and ultraviolet spectrums. Examples of image sensors may include semiconductor charge-coupled devices (CCD), active pixel sensors in complementary metal-oxide-semiconductor (CMOS), or N-type metal-oxide-semiconductor (NMOS, Live MOS). In some cases, image sensor 220 may be part of a camera included in apparatus 110.

Apparatus 110 may also include a processor 210 for controlling image sensor 220 to capture image data and for analyzing the image data according to the disclosed embodiments. As discussed in further detail below with respect to FIG. 5A, processor 210 may include a "processing device" for performing logic operations on one or more inputs of image data and other data according to stored or accessible software instructions providing desired functionality. In some embodiments, processor 210 may also control feedback outputting unit 230 to provide feedback to user 100 including information based on the analyzed image data and the stored software instructions. As the term is used herein, a "processing device" may access memory where executable instructions are stored or, in some embodiments, a "processing device" itself may include executable instructions (e.g., stored in memory included in the processing device).

In some embodiments, the information or feedback information provided to user 100 may include time information. The time information may include any information related to a current time of day and, as described further below, may be presented in any sensory perceptive manner. In some embodiments, time information may include a current time of day in a preconfigured format (e.g., 2:30 pm or 14:30). Time information may include the time in the user's current time zone (e.g., based on a determined location of user 100), as well as an indication of the time zone and/or a time of day in another desired location. In some embodiments, time information may include a number of hours or minutes relative to one or more predetermined times of day. For example, in some embodiments, time information may include an indication that three hours and fifteen minutes remain until a particular hour (e.g., until 6:00 pm), or some other predetermined time. Time information may also include a duration of time passed since the beginning of a particular activity, such as the start of a meeting or the start of a jog, or any other activity. In some embodiments, the activity may be determined based on analyzed image data. In other embodiments, time information may also include additional information related to a current time and one or more other routine, periodic, or scheduled events. For example, time information may include an indication of the number of minutes remaining until the next scheduled event, as may be determined from a calendar function or other information retrieved from computing device 120 or server 250, as discussed in further detail below.

Feedback outputting unit 230 may include one or more feedback systems for providing the output of information to user 100. In the disclosed embodiments, the audible or visual feedback may be provided via any type of connected audible or visual system or both. Feedback of information according to the disclosed embodiments may include audible feedback to user 100 (e.g., using a Bluetooth™ or other wired or wirelessly connected speaker, or a bone conduction headphone). Feedback outputting unit 230 of some embodiments may additionally or alternatively produce a visible output of information to user 100, for example, as part of an augmented reality display projected onto a lens of glasses 130 or provided via a separate heads up display in communication with apparatus 110, such as a display 260 provided as part of computing device 120, which may include an onboard automobile heads up display, an augmented reality device, a virtual reality device, a smartphone, PC, table, etc.

The term "computing device" refers to a device including a processing unit and having computing capabilities. Some examples of computing device 120 include a PC, laptop, tablet, or other computing systems such as an on-board computing system of an automobile, for example, each configured to communicate with apparatus 110 or server 250 over network 240. Another example of computing device 120 includes a smartphone having a display 260. In some embodiments, computing device 120 may be a computing system configured particularly for apparatus 110, and may be provided integral to apparatus 110 or tethered thereto. Apparatus 110 can also connect to computing device 120 over network 240 via any known wireless standard (e.g., Wi-Fi, Bluetooth®, etc.), as well as near-field capacitive coupling, and other short range wireless techniques, or via a wired connection. In an embodiment in which computing device 120 is a smartphone, computing device 120 may have a dedicated application installed therein. For example, user 100 may view on display 260 data (e.g., images, video clips, extracted information, feedback information, etc.) that originate from or are triggered by apparatus 110. In addition, user 100 may select part of the data for storage in server 250.

Network 240 may be a shared, public, or private network, may encompass a wide area or local area, and may be implemented through any suitable combination of wired and/or wireless communication networks. Network 240 may further comprise an intranet or the Internet. In some embodiments, network 240 may include short range or near-field wireless communication systems for enabling communication between apparatus 110 and computing device 120 provided in close proximity to each other, such as on or near a user's person, for example. Apparatus 110 may establish a connection to network 240 autonomously, for example, using a wireless module (e.g., Wi-Fi, cellular). In some embodiments, apparatus 110 may use the wireless module when being connected to an external power source, to prolong battery life. Further, communication between apparatus 110 and server 250 may be accomplished through any suitable communication channels, such as, for example, a telephone network, an extranet, an intranet, the Internet, satellite communications, off-line communications, wireless communications, transponder communications, a local area network (LAN), a wide area network (WAN), and a virtual private network (VPN).

As shown in FIG. 2, apparatus 110 may transfer or receive data to/from server 250 via network 240. In the disclosed embodiments, the data being received from server 250 and/or computing device 120 may include numerous different types of information based on the analyzed image data, including information related to a product, or a person's identity, an identified landmark, and any other information capable of being stored in or accessed by server 250. In some embodiments, data may be received and transferred via computing device 120. Server 250 and/or computing device 120 may retrieve information from different data sources (e.g., a user specific database or a user's social network account or other account, the Internet, and other managed or accessible databases) and provide information to apparatus 110 related to the analyzed image data and a recognized trigger according to the disclosed embodiments. In some embodiments, calendar-related information retrieved from the different data sources may be analyzed to provide certain time information or a time-based context for providing certain information based on the analyzed image data.

Figure 3A:
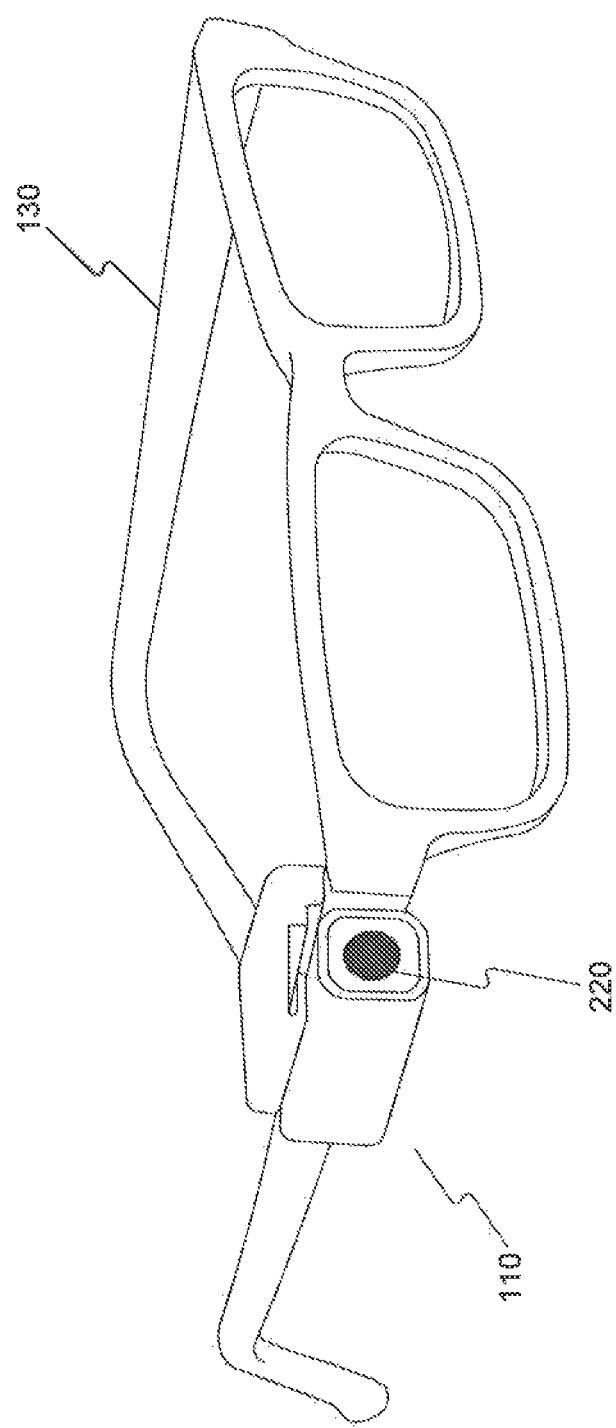
FIG. 3A is a schematic illustration of an example of the wearable apparatus shown in FIG. 1A.

An example of wearable apparatus 110 incorporated with glasses 130 according to some embodiments (as discussed in connection with FIG. 1A) is shown in greater detail in FIG. 3A. In some embodiments, apparatus 110 may be associated with a structure (not shown in FIG. 3A) that enables easy detaching and reattaching of apparatus 110 to glasses 130. In some embodiments, when apparatus 110 attaches to glasses 130, image sensor 220 acquires a set aiming direction without the need for directional calibration. The set aiming direction of image sensor 220 may substantially coincide with the field-of-view of user 100. For example, a camera associated with image sensor 220 may be installed within apparatus 110 in a predetermined angle in a position facing slightly downwards (e.g., 5-15 degrees from the horizon). Accordingly, the set aiming direction of image sensor 220 may substantially match the field-of-view of user 100.

FIG. 3B is an exploded view of the components of the embodiment discussed regarding FIG. 3A. Attaching apparatus 110 to glasses 130 may take place in the following way. Initially, a support 310 may be mounted on glasses 130 using a screw 320, in the side of support 310. Then, apparatus 110 may be clipped on support 310 such that it is aligned with the field-of-view of user 100. The term "support" includes any device or structure that enables detaching and reattaching of a device including a camera to a pair of glasses or to another object (e.g., a helmet). Support 310 may be made from plastic (e.g., polycarbonate), metal (e.g., aluminum), or a combination of plastic and metal (e.g., carbon fiber graphite). Support 310 may be mounted on any kind of glasses (e.g., eyeglasses, sunglasses, 3D glasses, safety glasses, etc.) using screws, bolts, snaps, or any fastening means used in the art.

In some embodiments, support 310 may include a quick release mechanism for disengaging and reengaging apparatus 110. For example, support 310 and apparatus 110 may include magnetic elements. As an alternative example, support 310 may include a male latch member and apparatus 110 may include a female receptacle. In other embodiments, support 310 can be an integral part of a pair of glasses, or sold separately and installed by an optometrist. For example, support 310 may be configured for mounting on the arms of glasses 130 near the frame front, but before the hinge. Alternatively, support 310 may be configured for mounting on the bridge of glasses 130.

In some embodiments, apparatus 110 may be provided as part of a glasses frame 130, with or without lenses. Additionally, in some embodiments, apparatus 110 may be configured to provide an augmented reality display projected onto a lens of glasses 130 (if provided), or alternatively, may include a display for projecting time information, for example, according to the disclosed embodiments. Apparatus 110 may include the additional display or alternatively, may be in communication with a separately provided display system that may or may not be attached to glasses 130.

In some embodiments, apparatus 110 may be implemented in a form other than wearable glasses, as described above with respect to FIGS. 1B-ID, for example. FIG. 4A is a schematic illustration of an example of an additional embodiment of apparatus 10 from a first viewpoint. The viewpoint shown in FIG. 4A is from the front of apparatus 110. Apparatus 110 includes an image sensor 220, a clip (not shown), a function button (not shown) and a hanging ring 410 for attaching apparatus 110 to, for example, necklace 140, as shown in FIG. 1B. When apparatus 110 hangs on necklace 140, the aiming direction of image sensor 220 may not fully coincide with the field-of-view of user 100, but the aiming direction would still correlate with the field-of-view of user 100.

FIG. 4B is a schematic illustration of the example of a second embodiment of apparatus 110, from a second viewpoint. The viewpoint shown in FIG. 4B is from a side orientation of apparatus 110. In addition to hanging ring 410, as shown in FIG. 4B, apparatus 110 may further include a clip 420. User 100 can use clip 420 to attach apparatus 110 to a shirt or belt 150, as illustrated in FIG. 1C. Clip 420 may provide an easy mechanism for disengaging and reengaging apparatus 110 from different articles of clothing. In other embodiments, apparatus 110 may include a female receptacle for connecting with a male latch of a car mount or universal stand.

In some embodiments, apparatus 110 includes a function button 430 for enabling user 100 to provide input to apparatus 110. Function button 430 may accept different types of tactile input (e.g., a tap, a click, a double-click, a long press, a right-to-left slide, a left-to-right slide). In some embodiments, each type of input may be associated with a different action. For example, a tap may be associated with the function of taking a picture, while a right-to-left slide may be associated with the function of recording a video.

The example embodiments discussed above with respect to FIGS. 3A, 3B, 4A, and 4B are not limiting. In some embodiments, apparatus 110 may be implemented in any suitable configuration for performing the disclosed methods. For example, referring back to FIG. 2, the disclosed embodiments may implement an apparatus 110 according to any configuration including an image sensor 220 and a processor unit 210 to perform image analysis and for communicating with a feedback unit 230.

Figure 5A:
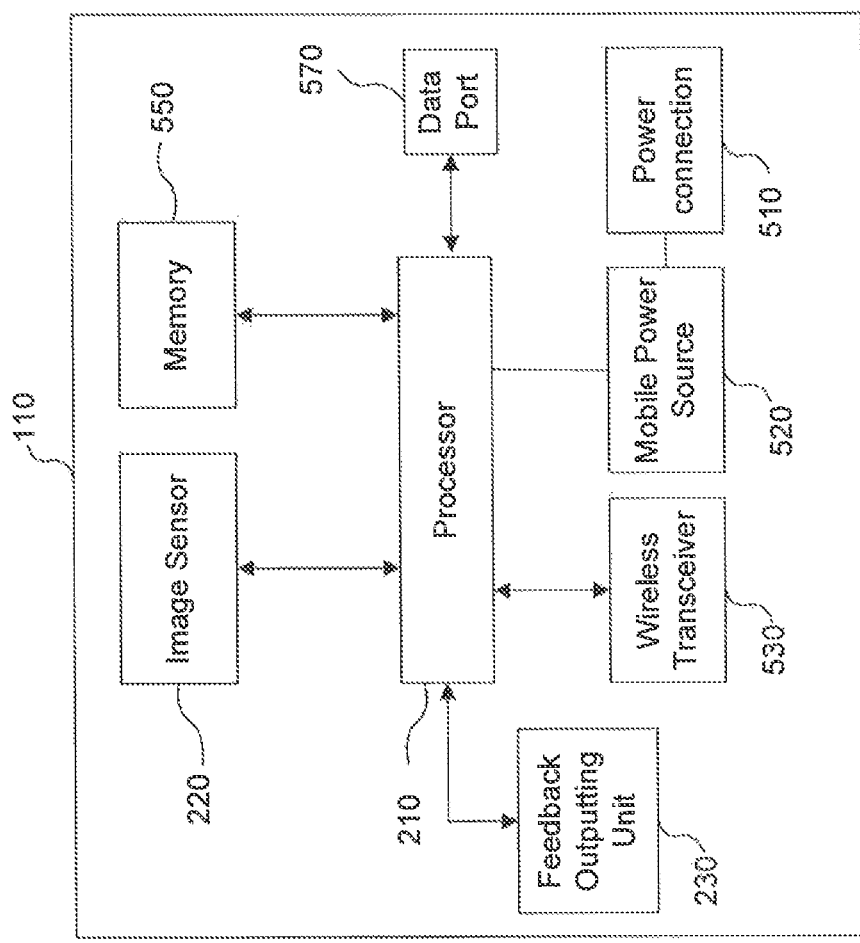
FIG. 5A is a block diagram illustrating an example of the components of a wearable apparatus according to a first embodiment.

FIG. 5A is a block diagram illustrating the components of apparatus 110 according to an example embodiment. As shown in FIG. 5A, and as similarly discussed above, apparatus 110 includes an image sensor 220, a memory 550, a processor 210, a feedback outputting unit 230, a wireless transceiver 530, and a mobile power source 520. In other embodiments, apparatus 110 may also include buttons, other sensors such as a microphone, and inertial measurements devices such as accelerometers, gyroscopes, magnetometers, temperature sensors, color sensors, light sensors, etc. Apparatus 110 may further include a data port 570 and a power connection 510 with suitable interfaces for connecting with an external power source or an external device (not shown).

Processor 210, depicted in FIG. 5A, may include any suitable processing device. The term "processing device" includes any physical device having an electric circuit that performs a logic operation on input or inputs. For example, processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by the processing device may, for example, be pre-loaded into a memory integrated with or embedded into the processing device or may be stored in a separate memory (e.g., memory 550). Memory 550 may comprise a Random Access Memory (RAM), a Read-Only Memory (ROM), a hard disk, an optical disk, a magnetic medium, a flash memory, other permanent, fixed, or volatile memory, or any other mechanism capable of storing instructions.

Although, in the embodiment illustrated in FIG. 5A, apparatus 110 includes one processing device (e.g., processor 210), apparatus 110 may include more than one processing device. Each processing device may have a similar construction, or the processing devices may be of differing constructions that are electrically connected or disconnected from each other. For example, the processing devices may be separate circuits or integrated in a single circuit. When more than one processing device is used, the processing devices may be configured to operate independently or collaboratively. The processing devices may be coupled electrically, magnetically, optically, acoustically, mechanically or by other means that permit them to interact.

In some embodiments, processor 210 may process a plurality of images captured from the environment of user 100 to determine different parameters related to capturing subsequent images. For example, processor 210 can determine, based on information derived from captured image data, a value for at least one of the following: an image resolution, a compression ratio, a cropping parameter, frame rate, a focus point, an exposure time, an aperture size, and a light sensitivity. The determined value may be used in capturing at least one subsequent image. Additionally, processor 210 can detect images including at least one hand-related trigger in the environment of the user and perform an action and/or provide an output of information to a user via feedback outputting unit 230.

In another embodiment, processor 210 can change the aiming direction of image sensor 220. For example, when apparatus 110 is attached with clip 420, the aiming direction of image sensor 220 may not coincide with the field-of-view of user 100. Processor 210 may recognize certain situations from the analyzed image data and adjust the aiming direction of image sensor 220 to capture relevant image data. For example, in one embodiment, processor 210 may detect an interaction with another individual and sense that the individual is not fully in view, because image sensor 220 is tilted down. Responsive thereto, processor 210 may adjust the aiming direction of image sensor 220 to capture image data of the individual. Other scenarios are also contemplated where processor 210 may recognize the need to adjust an aiming direction of image sensor 220.

In some embodiments, processor 210 may communicate data to feedback-outputting unit 230, which may include any device configured to provide information to a user 100. Feedback outputting unit 230 may be provided as part of apparatus 110 (as shown) or may be provided external to apparatus 110 and communicatively coupled thereto. Feedback-outputting unit 230 may be configured to output visual or nonvisual feedback based on signals received from processor 210, such as when processor 210 recognizes a hand-related trigger in the analyzed image data.

The term "feedback" refers to any output or information provided in response to processing at least one image in an environment. In some embodiments, as similarly described above, feedback may include an audible or visible indication of time information, detected text or numerals, the value of currency, a branded product, a person's identity, the identity of a landmark or other environmental situation or condition including the street names at an intersection or the color of a traffic light, etc., as well as other information associated with each of these. For example, in some embodiments, feedback may include additional information regarding the amount of currency still needed to complete a transaction, information regarding the identified person, historical information or times and prices of admission etc. of a detected landmark etc. In some embodiments, feedback may include an audible tone, a tactile response, and/or information previously recorded by user 100. Feedback-outputting unit 230 may comprise appropriate components for outputting acoustical and tactile feedback. For example, feedback-outputting unit 230 may comprise audio headphones, a hearing aid type device, a speaker, a bone conduction headphone, interfaces that provide tactile cues, vibrotactile stimulators, etc. In some embodiments, processor 210 may communicate signals with an external feedback outputting unit 230 via a wireless transceiver 530, a wired connection, or some other communication interface. In some embodiments, feedback outputting unit 230 may also include any suitable display device for visually displaying information to user 100.

As shown in FIG. 5A, apparatus 110 includes memory 550. Memory 550 may include one or more sets of instructions accessible to processor 210 to perform the disclosed methods, including instructions for recognizing a hand-related trigger in the image data. In some embodiments memory 550 may store image data (e.g., images, videos) captured from the environment of user 100. In addition, memory 550 may store information specific to user 100, such as image representations of known individuals, favorite products, personal items, and calendar or appointment information, etc. In some embodiments, processor 210 may determine, for example, which type of image data to store based on available storage space in memory 550. In another embodiment, processor 210 may extract information from the image data stored in memory 550.

As further shown in FIG. 5A, apparatus 110 includes mobile power source 520. The term "mobile power source" includes any device capable of providing electrical power, which can be easily carried by hand (e.g., mobile power source 520 may weigh less than a pound). The mobility of the power source enables user 100 to use apparatus 110 in a variety of situations. In some embodiments, mobile power source 520 may include one or more batteries (e.g., nickel-cadmium batteries, nickel-metal hydride batteries, and lithium-ion batteries) or any other type of electrical power supply. In other embodiments, mobile power source 520 may be rechargeable and contained within a casing that holds apparatus 110. In yet other embodiments, mobile power source 520 may include one or more energy harvesting devices for converting ambient energy into electrical energy (e.g., portable solar power units, human vibration units, etc.).

Mobile power source 510 may power one or more wireless transceivers (e.g., wireless transceiver 530 in FIG. 5A). The term "wireless transceiver" refers to any device configured to exchange transmissions over an air interface by use of radio frequency, infrared frequency, magnetic field, or electric field. Wireless transceiver 530 may use any known standard to transmit and/or receive data (e.g., Wi-Fi, Bluetooth®, Bluetooth Smart, 802.15.4, or ZigBee). In some embodiments, wireless transceiver 530 may transmit data (e.g., raw image data, processed image data, extracted information) from apparatus 110 to computing device 120 and/or server 250. Wireless transceiver 530 may also receive data from computing device 120 and/or server 250. In other embodiments, wireless transceiver 530 may transmit data and instructions to an external feedback outputting unit 230.

Figure 5B:
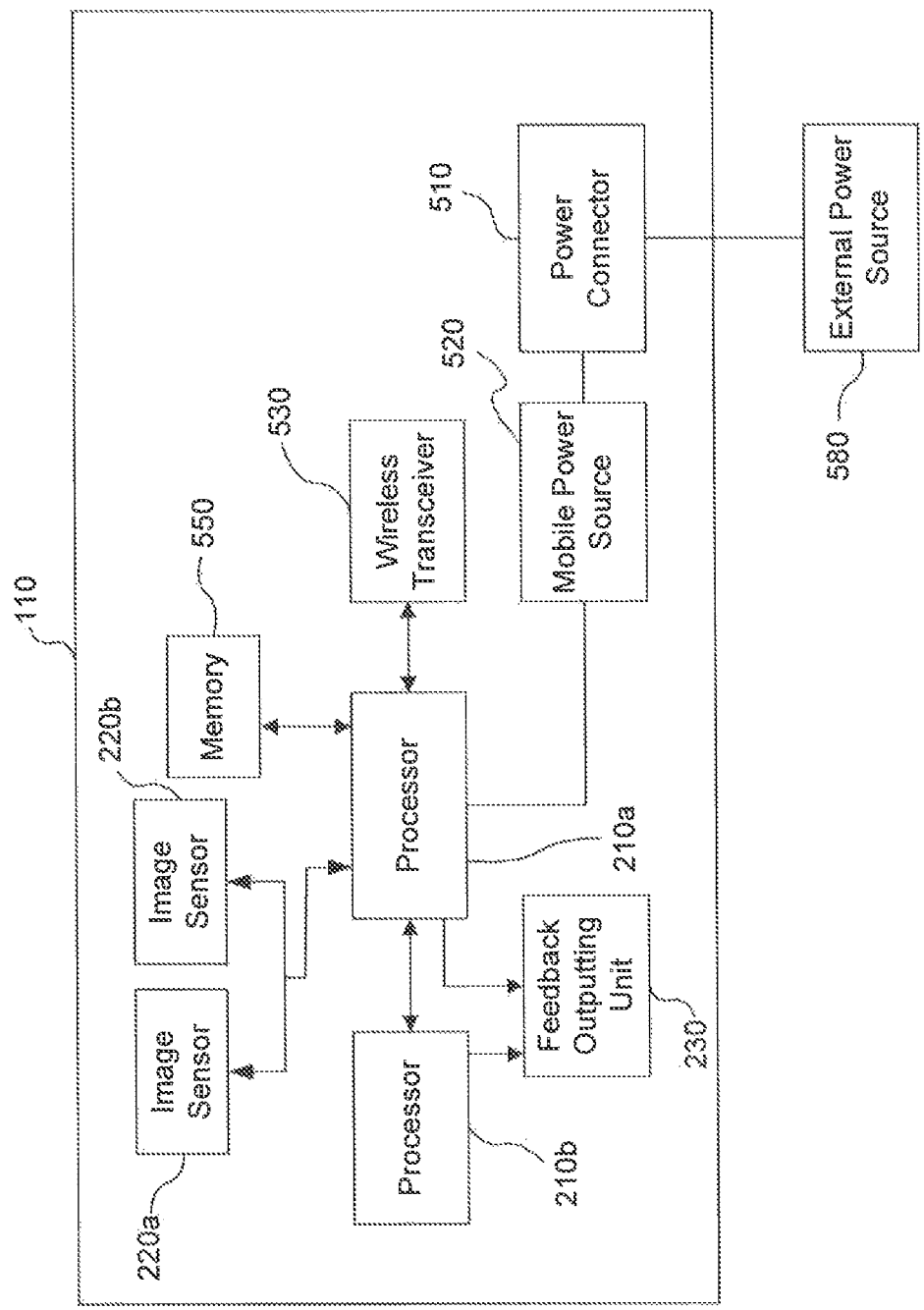
FIG. 5B is a block diagram illustrating an example of the components of a wearable apparatus according to a second embodiment.

FIG. 5B is a block diagram illustrating the components of apparatus 110 according to another example embodiment. In some embodiments, apparatus 110 includes a first image sensor 220a, a second image sensor 220b, a memory 550, a first processor 210a, a second processor 210b, a feedback outputting unit 230, a wireless transceiver 530, a mobile power source 520, and a power connector 510. In the arrangement shown in FIG. 5B, each of the image sensors may provide images in a different image resolution, or face a different direction. Alternatively, each image sensor may be associated with a different camera (e.g., a wide angle camera, a narrow angle camera, an IR camera, etc.). In some embodiments, apparatus 110 can select which image sensor to use based on various factors. For example, processor 210a may determine, based on available storage space in memory 550, to capture subsequent images in a certain resolution.

Apparatus 110 may operate in a first processing-mode and in a second processing-mode, such that the first processing-mode may consume less power than the second processing-mode. For example, in the first processing-mode, apparatus 110 may capture images and process the captured images to make real-time decisions based on an identified hand-related trigger, for example. In the second processing-mode, apparatus 110 may extract information from stored images in memory 550 and delete images from memory 550. In some embodiments, mobile power source 520 may provide more than fifteen hours of processing in the first processing-mode and about three hours of processing in the second processing-mode. Accordingly, different processing-modes may allow mobile power source 520 to produce sufficient power for powering apparatus 110 for various time periods (e.g., more than two hours, more than four hours, more than ten hours, etc.).

In some embodiments, apparatus 110 may use first processor 210a in the first processing-mode when powered by mobile power source 520, and second processor 210b in the second processing-mode when powered by external power source 580 that is connectable via power connector 510. In other embodiments, apparatus 110 may determine, based on predefined conditions, which processors or which processing modes to use. Apparatus 110 may operate in the second processing-mode even when apparatus 110 is not powered by external power source 580. For example, apparatus 110 may determine that it should operate in the second processing-mode when apparatus 110 is not powered by external power source 580, if the available storage space in memory 550 for storing new image data is lower than a predefined threshold.

Although one wireless transceiver is depicted in FIG. 5B, apparatus 110 may include more than one wireless transceiver (e.g., two wireless transceivers). In an arrangement with more than one wireless transceiver, each of the wireless transceivers may use a different standard to transmit and/or receive data. In some embodiments, a first wireless transceiver may communicate with server 250 or computing device 120 using a cellular standard (e.g., LTE or GSM), and a second wireless transceiver may communicate with server 250 or computing device 120 using a short-range standard (e.g., Wi-Fi or Bluetooth®). In some embodiments, apparatus 110 may use the first wireless transceiver when the wearable apparatus is powered by a mobile power source included in the wearable apparatus, and use the second wireless transceiver when the wearable apparatus is powered by an external power source.

Figure 5C:
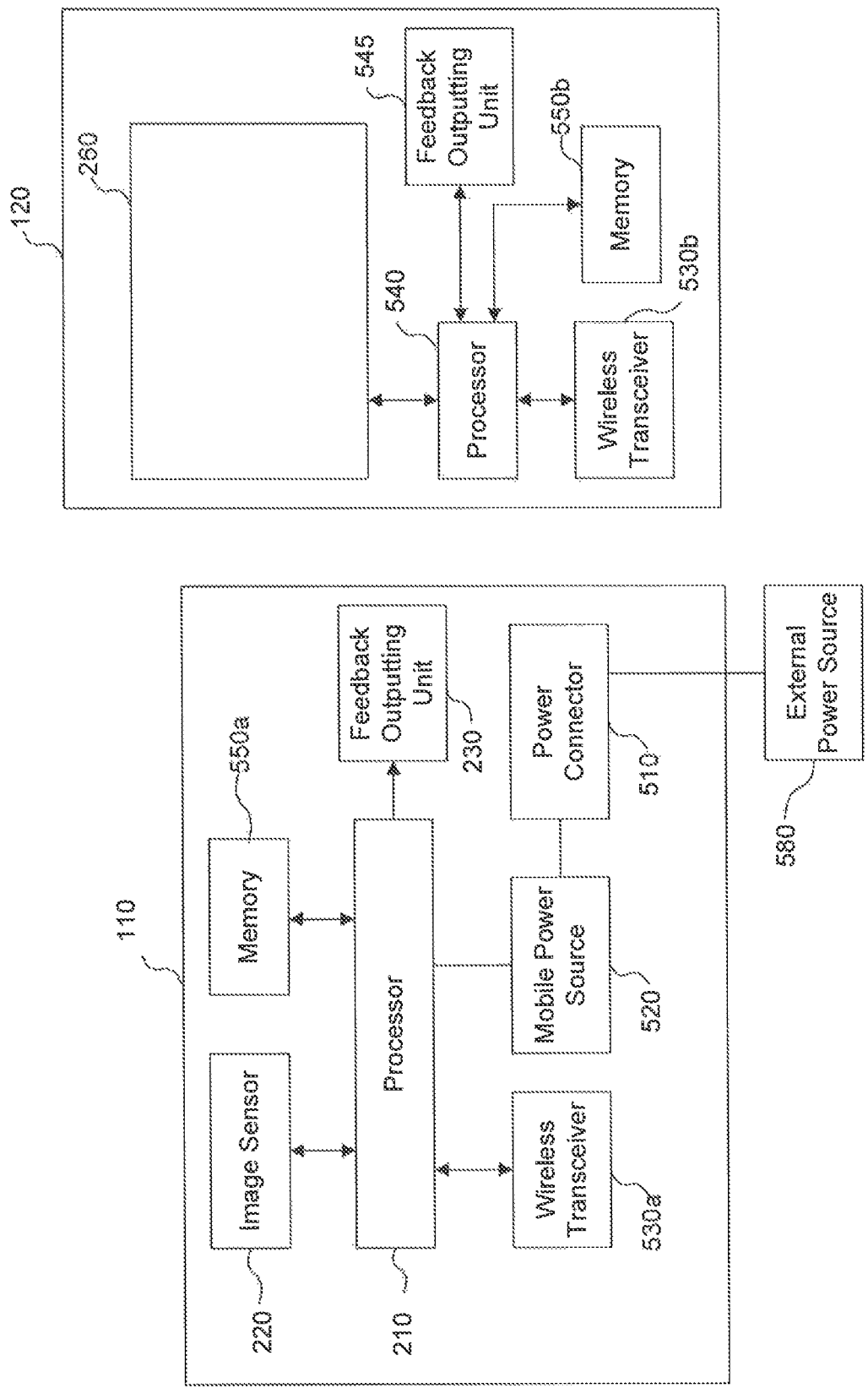
FIG. 5C is a block diagram illustrating an example of the components of a wearable apparatus according to a third embodiment.

FIG. 5C is a block diagram illustrating the components of apparatus 110 according to another example embodiment including computing device 120. In this embodiment, apparatus 110 includes an image sensor 220, a memory 550a, a first processor 210, a feedback-outputting unit 230, a wireless transceiver 530a, a mobile power source 520, and a power connector 510. As further shown in FIG. 5C, computing device 120 includes a processor 540, a feedback-outputting unit 545, a memory 550*b*, a wireless transceiver 530*b*, and a display 260. One example of computing device 120 is a smartphone or tablet having a dedicated application installed therein. In other embodiments, computing device 120 may include any configuration such as an on-board automobile computing system, a PC, a laptop, and any other system consistent with the disclosed embodiments. In this example, user 100 may view feedback output in response to identification of a hand-related trigger on display 260. Additionally, user 100 may view other data (e.g., images, video clips, object information, schedule information, extracted information, etc.) on display 260. In addition, user 100 may communicate with server 250 via computing device 120.

In some embodiments, processor 210 and processor 540 are configured to extract information from captured image data. The term "extracting information" includes any process by which information associated with objects, individuals, locations, events, etc., is identified in the captured image data by any means known to those of ordinary skill in the art. In some embodiments, apparatus 110 may use the extracted information to send feedback or other real-time indications to feedback outputting unit 230 or to computing device 120. In some embodiments, processor 210 may identify in the image data the individual standing in front of user 100, and send computing device 120 the name of the individual and the last time user 100 met the individual. In another embodiment, processor 210 may identify in the image data, one or more visible triggers, including a hand-related trigger, and determine whether the trigger is associated with a person other than the user of the wearable apparatus to selectively determine whether to perform an action associated with the trigger. One such action may be to provide a feedback to user 100 via feedback-outputting unit 230 provided as part of (or in communication with) apparatus 110 or via a feedback unit 545 provided as part of computing device 120. For example, feedback-outputting unit 545 may be in communication with display 260 to cause the display 260 to visibly output information. In some embodiments, processor 210 may identify in the image data a hand-related trigger and send computing device 120 an indication of the trigger. Processor 540 may then process the received trigger information and provide an output via feedback outputting unit 545 or display 260 based on the hand-related trigger. In other embodiments, processor 540 may determine a hand-related trigger and provide suitable feedback similar to the above, based on image data received from apparatus 110. In some embodiments, processor 540 may provide instructions or other information, such as environmental information to apparatus 110 based on an identified hand-related trigger.

In some embodiments, processor 210 may identify other environmental information in the analyzed images, such as an individual standing in front user 100, and send computing device 120 information related to the analyzed information such as the name of the individual and the last time user 100 met the individual. In a different embodiment, processor 540 may extract statistical information from captured image data and forward the statistical information to server 250. For example, certain information regarding the types of items a user purchases, or the frequency a user patronizes a particular merchant, etc. may be determined by processor 540. Based on this information, server 250 may send computing device 120 coupons and discounts associated with the user's preferences.

When apparatus 110 is connected or wirelessly connected to computing device 120, apparatus 110 may transmit at least part of the image data stored in memory 550*a* for storage in memory 550*b*. In some embodiments, after computing device 120 confirms that transferring the part of image data was successful, processor 540 may delete the part of the image data. The term "delete" means that the image is marked as 'deleted' and other image data may be stored instead of it, but does not necessarily mean that the image data was physically removed from the memory.

As will be appreciated by a person skilled in the art having the benefit of this disclosure, numerous variations and/or modifications may be made to the disclosed embodiments. Not all components are essential for the operation of apparatus 110. Any component may be located in any appropriate apparatus and the components may be rearranged into a variety of configurations while providing the functionality of the disclosed embodiments. Therefore, the foregoing configurations are examples and, regardless of the configurations discussed above, apparatus 110 can capture, store, and process images.

Further, the foregoing and following description refers to storing and/or processing images or image data. In the embodiments disclosed herein, the stored and/or processed images or image data may comprise a representation of one or more images captured by image sensor 220. As the term is used herein, a "representation" of an image (or image data) may include an entire image or a portion of an image. A representation of an image (or image data) may have the same resolution or a lower resolution as the image (or image data), and/or a representation of an image (or image data) may be altered in some respect (e.g., be compressed, have a lower resolution, have one or more colors that are altered, etc.).

For example, apparatus 110 may capture an image and store a representation of the image that is compressed as a .JPG file. As another example, apparatus 110 may capture an image in color, but store a black-and-white representation of the color image. As yet another example, apparatus 110 may capture an image and store a different representation of the image (e.g., a portion of the image). For example, apparatus 110 may store a portion of an image that includes a face of a person who appears in the image, but that does not substantially include the environment surrounding the person. Similarly, apparatus 110 may, for example, store a portion of an image that includes a product that appears in the image, but does not substantially include the environment surrounding the product. As yet another example, apparatus 110 may store a representation of an image at a reduced resolution (i.e., at a resolution that is of a lower value than that of the captured image). Storing representations of images may allow apparatus 110 to save storage space in memory 550. Furthermore, processing representations of images may allow apparatus 110 to improve processing efficiency and/or help to preserve battery life.

In addition to the above, in some embodiments, any one of apparatus 110 or computing device 120, via processor 210 or 540, may further process the captured image data to provide additional functionality to recognize objects and/or gestures and/or other information in the captured image data. In some embodiments, actions may be taken based on the identified objects, gestures, or other information. In some embodiments, processor 210 or 540 may identify in the image data, one or more visible triggers, including a hand-related trigger, and determine whether the trigger is associated with a person other than the user to determine whether to perform an action associated with the trigger.

An embodiment consistent with the present disclosure provides a system and a method for providing user 100 with information based on one or more objects and triggers or situations detected within the field of view of apparatus 110. For example, apparatus 110 may be configured to identify a hand-related trigger in real-time image data. Apparatus 100 may further identify in the image data one or more objects associated with the hand-related trigger, as well as a context associated with the object(s) and the hand-related trigger. Based on the hand-related trigger and/or identified context, apparatus 110 may select one of a plurality of alternative actions to execute or feedback to provide. The capability of apparatus 110 to automatically select and execute actions based on an identified trigger may provide user 100 with the opportunity to more efficiently perform certain actions (such as determining the value of currency, selecting a product for purchase, etc.) and fully interact with their surrounding environment.

Figure 6:
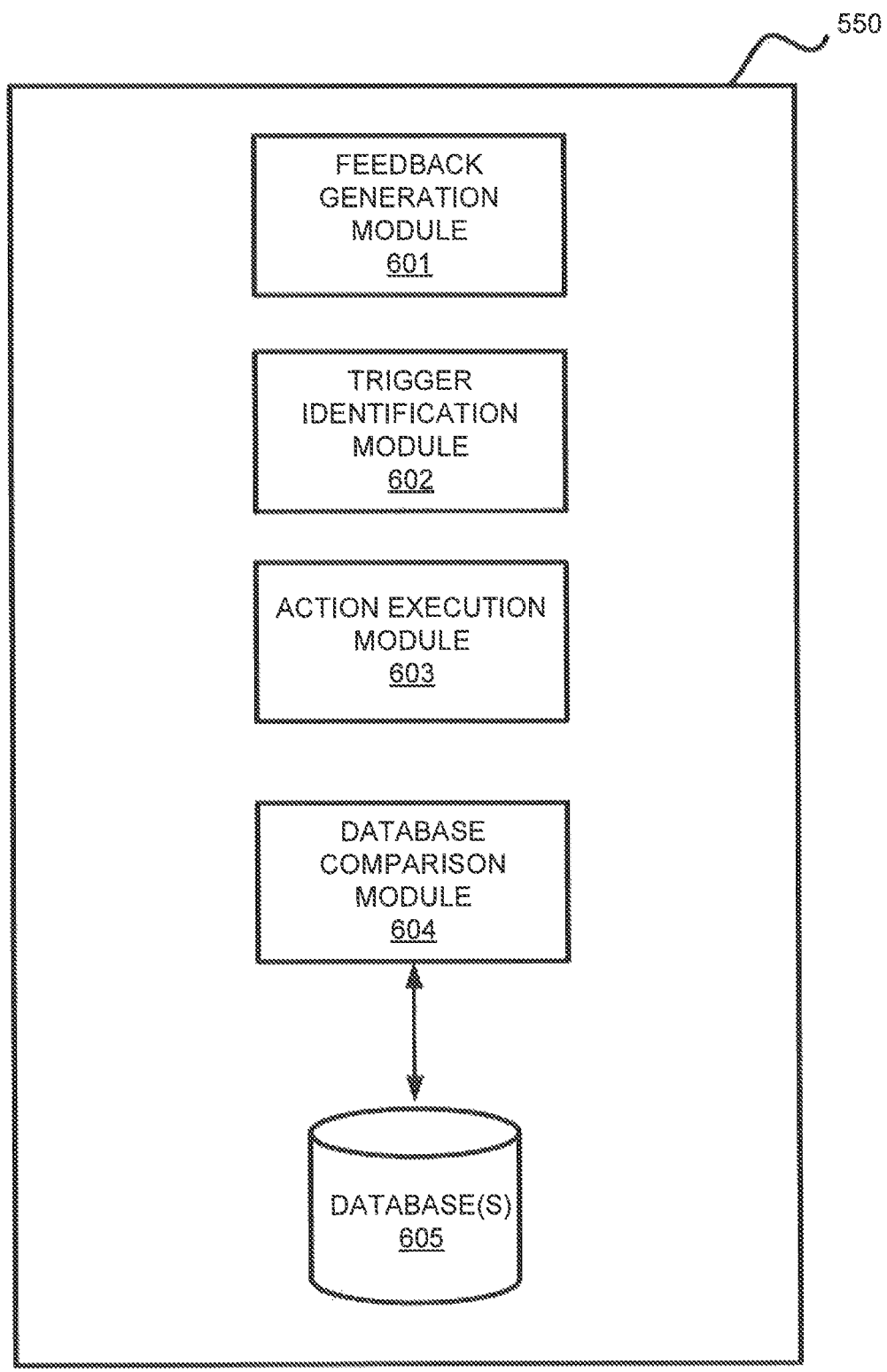
FIG. 6 is a block diagram illustrating an example of a memory contained within an apparatus for providing feedback to a person based on a trigger.

FIG. 6 is a block diagram illustrating a memory (e.g., 550, 550a, or 550b) associated with apparatus 110 or computing device 120 according to the disclosed embodiments. The memory may include one or more modules, or sets of instructions, for performing a method consistent with the disclosed embodiments. For example, a memory may include instructions for a processor to capture images from an environment of a user via an image sensor, analyze the captured images, identify a hand-related trigger in the analyzed image data, and output feedback of information via one or more available output devices. In the example shown in FIG. 6, memory 550 comprises a feedback generation module 601, a trigger identification module 602, an action execution module 603, a database comparison module 604, and one or more databases 605 for performing the functionality of the disclosed methods. The modules shown in FIG. 6 are by example only, and a processor in the disclosed embodiments may operate according to any suitable image analysis and feedback process.

Feedback generation module 601 may provide functionality for apparatus 110 (or computing device 120) to generate and transmit feedback or information to user 100 in response to an identified hand-related or environmental trigger or some other query. Processor 210 or 540 may execute feedback generation module 601 to generate and process feedback in a given context, then transmit the generated feedback to feedback-outputting unit 230 or 545 for output to user 100. In some embodiments, processor 210 or 540 and feedback-outputting unit 230 or 545 may be operatively connected via an electrical connection. In other embodiments, processor 210 or 540 and feedback-outputting unit 230 or 545 may be operatively connected via wireless transceiver(s) 530. As discussed above, in some embodiments, feedback generation module 601 may generate audible or visible feedback to user 100. In other embodiments, the feedback may be tactile in nature, such as a vibration.

Trigger identification module 602 may provide functionality for apparatus 110 to identify, in real-time, audible or visual triggers that may precipitate a change in an operational status of apparatus 110. As used in this disclosure, a "trigger" may include, for example, the appearance of user 100's hand within the field of view of apparatus 110 in a certain position or while making a pre-defined gesture. Any external stimulus may constitute a trigger, including gestures performed by persons other than the user, and/or auditory signals. In some embodiments, for example, user 100 may be able to audibly say words that serve as triggers, such as "Show," "When," "What," etc. It is understood that these are non-limiting examples. Trigger identification module 602 may be configured to detect the presence of triggers and cause processor 210 or 540 to execute software instructions that operate apparatus 110 or computing device 120 in a manner associated with the trigger. For example, in the disclosed embodiments, trigger identification module 602 may be configured to detect a hand-related trigger and cause processor 210 or 540 to output feedback to a user of information related to an object or other condition associated with the hand-related trigger, as described in further detail below.

Action execution module 603 may provide functionality for apparatus 110 to execute various functions in response to stimuli, be they triggers managed by user 100, the appearance of objects within the field of view of apparatus 110, or other events occurring while apparatus 110 is in operation. Action execution module 603 may, for example, coordinate the configuration and execution of one or more alternative actions that may be available to apparatus 110 upon positive identification of a hand-related trigger, other triggers, an object, or a particular situation, etc.

Database comparison module 604 may provide functionality for apparatus 110 to compare objects detected in the user environment to objects and/or categories of said objects in a database, such as database(s) 605, to be described in detail below. In some embodiments, database comparison module 604 may derive information from real-time image data received from image sensor 220. In other embodiments, other software elements or processors may derive the information and provide it to database comparison module 604. For example, processor 210 or 540 may execute database comparison module 604 to access one or more of the described databases, and compare the information derived from the received real-time image data with information in the databases. If the derived information corresponds to information found in one or more of the databases, database comparison module 604 may provide an indication to feedback generation module 601 to that effect, as discussed in further detail below in association with FIGS. 9-11.

Database(s) 605 may comprise one or more databases that store information and are accessed and/or managed through memory 550 (and/or 550a, 550b). By way of example, databases 605 may include document management systems, Microsoft™ SQL databases, SharePoint™ databases, Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. Databases 605 may contain software code or macros that facilitate rapid searching and comparison by database comparison module 604.

Feedback generation module 601, trigger identification module 602, action execution module 603, and database comparison module 604 may be implemented in software, hardware, firmware, a mix of any of those, or the like. For example, if the modules are implemented in software, they may be stored in memory 550, as shown in FIG. 6. Other components of processing unit 210 or 540 may be configured to perform processes to implement and facilitate operations of the modules. Thus, feedback generation module 601, trigger identification module 602, action execution module 603, and database comparison module 604 may include software, hardware, or firmware instructions (or a combination thereof) executable by one or more processors (e.g., processor 210 or 540), alone or in various combinations with each other. For example, the modules may be configured to interact with each other and/or other modules of apparatus 110 to perform functions consistent with disclosed embodiments. In some embodiments, any of the disclosed modules (e.g., feedback generation module 601, trigger identification module 602, action execution module 603, and database comparison module 604) may each include dedicated sensors (e.g., IR, image sensors, etc.) and/or dedicated application processing devices to perform the functionality associated with each module.

As used herein, real-time image data may refer to image data captured in real-time or near real-time. For example, trigger identification module 602 may monitor the field-of-view of apparatus 110 to detect triggers, such as a hand-related trigger, or other inputs, while action execution module 603 may determine whether to execute a particular action based on a detected trigger. Accordingly, trigger identification module 602 and action execution module 603 may operate in parallel to process captured image data. That is, apparatus 110 may capture and analyze image data in parallel, or may institute a queue-like implementation whereby image data is captured and then analyzed in a continuous fashion (i.e., a first image is captured and analyzed while a subsequent image is captured and then subsequently analyzed).

Figure 7:
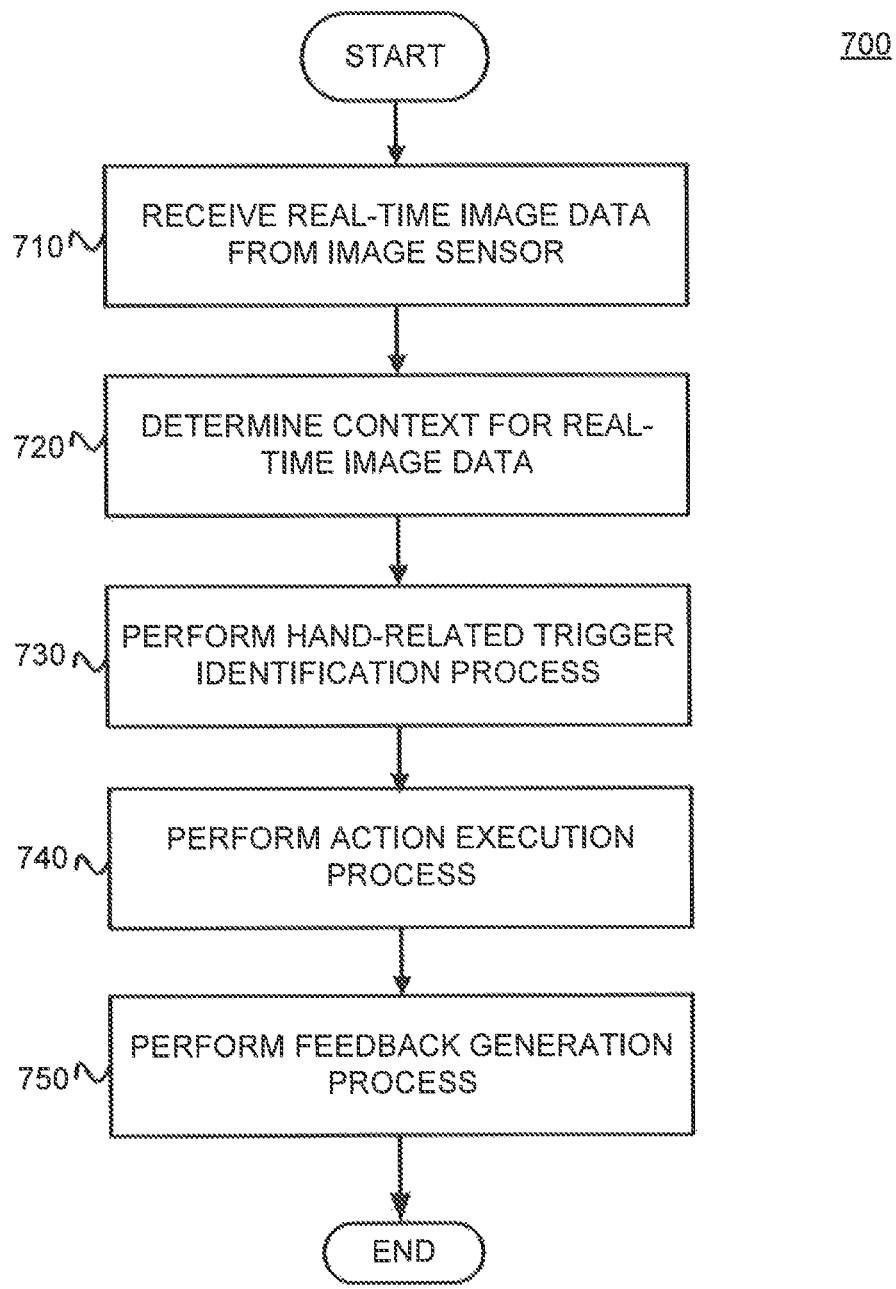
FIG. 7 is an example of a process for providing feedback to a person based on a trigger, consistent with disclosed embodiments.

FIG. 7 illustrates an example of a process 700 for providing feedback to a person based on captured image data consistent with certain disclosed embodiments. Process 700, as well as any or all of the individual steps therein, may be performed by various aspects of apparatus 110 and/or computing device 120, and any subcomponents therein. For exemplary purposes, FIG. 7 is described as being performed by processor 210 or 540, executing software instructions stored within memory 550.

Processor 210 or 540 may receive real-time image data from an image sensor, such as image sensor 220 (Step 710). In other embodiments, processor 210 or 540 may receive the image data from an intermediate component associated with image sensor 220. The intermediate component may, for example, perform image processing operations on the real-time image data before transmitting it to processor 210 or 540. In some embodiments, the real-time image data may be received as a single streaming video file. In other embodiments, the real-time image data may be received as a series of still images. When the image data is received, processor 210 or 540 may store the data in memory 550 or database(s) 605.

Processor 210 or 540 may determine a context for the received real-time image data based on stored information that facilitates the execution of one or more actions (Step 720). In some embodiments, processor 210 or 540 may execute software instructions to process the representations of one or more objects or gestures detected in the real-time image data. In some embodiments, the processing may comprise image processing, such as image rotation, a change in the size of the image, image sharpening, cropping the image, enhancing the focus, etc. It is understood that these are non-limiting examples and that any manner of image processing may be applied to the real-time image data. In other embodiments, the processing may comprise optical character recognition (OCR), when the real-time image data comprises numerals or text. In some embodiments, the optical character recognition may facilitate recognition of the visualized text by processor 210 or 540, and facilitate formation of a search query for a database containing object information. Processor 210 or 540 may further derive or determine any other information contained in the received real-time image data relating to the context of the image, such as date, time, geographical location, etc. In some embodiments, processor 210 or 540 may derive information based on a plurality of images, so as to determine whether a motion or gesture is captured in the image data.

In Step 730 of process 700, processor 210 or 540 may perform a hand-related trigger identification process (via trigger identification module 602, for example), similar to the process described below in connection with FIG. 9. In brief, according to some embodiments, trigger identification module 602 may configure components of apparatus 110, such as image sensor 220 and/or other components of apparatus 110, to operate in a "ready mode" for trigger detection. Trigger identification module 602 may determine if any external trigger, visible or auditory, is received. In some embodiments, trigger identification module 602 may determine if a hand is present in the real-time image data and whether the hand is associated with user 100. In some embodiments, trigger identification module 602 may determine if a motion of a user's hand corresponds to a hand-related trigger. Additionally, trigger identification module 602 may determine whether other features of a hand-related trigger are present in the image data, such as a pointing finger, a fist, outstretched fingers or other particular manipulations of the fingers or hand, etc. If the user's hand (or other hand-related trigger or gesture) is present, trigger identification module 602 may determine the hand-related trigger, if any, that is represented in the real-time image data, as well as any objects associated with the hand-related trigger. Trigger identification module 602 may further determine one or more data categories associated with the determined hand trigger.

Processor 210 or 540, via action execution module 603, may perform an action execution process, such as is described below in connection with FIG. 10 (Step 740). In brief, according to some embodiments, action execution module 603 may determine an object associated with a hand-related trigger identified in received real-time image data. Action execution module 603 may also determine a context associated with the object. Based on the identified hand-related trigger and context, action execution module 603, in conjunction with database comparison module 604, may determine context-based alternative actions associated with the trigger and the identified object. Action execution module 603 may select one or more of the determined context-based alternative actions, and then execute the selected action(s).

In some embodiments, one or more actions associated with the identified hand-related trigger may be performed if a determined time-component meets or exceeds a predefined or programmable threshold. For example, when the image data includes a video stream, one or more actions may be performed when the hand-related trigger appears in the image data for at least two or three seconds, or more. In another example, when the image data includes a still image, one or more actions may be performed when the hand-related trigger appears in three or more consecutive images. The threshold number of consecutive images may be determined based on a capture rate of image data, and thus may be many more than three images in some embodiments. For example, the threshold number of images may correspond to the number of images that may be captured in a two or three second duration similar to the above video stream example. When it is determined that a threshold associated with the determined time component has not been met, process 740 may withhold performing an action until a future hand-related trigger satisfies the threshold.

Processor 210 or 540, via feedback generation module 601, may perform a feedback generation process, such as is described below in connection with FIG. 11 (Step 750). According to some embodiments, feedback generation module 601 may receive information associated with one or more hand-related triggers identified in the real-time image data. Feedback generation module 601 may determine visible and/or audible or other feedback for output to user 100. Feedback generation module 601 may configure the feedback, and then provide the feedback to feedback-outputting unit 230 or 545 for output to user 100.

Figure 8A:
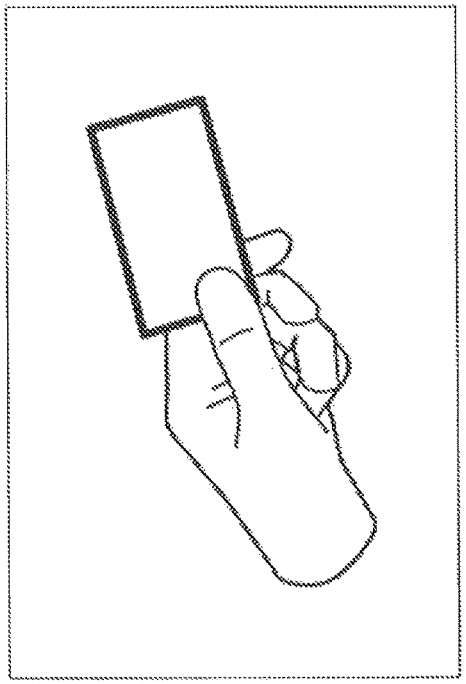
FIG. 8A is an example illustration of a hand-related trigger for an apparatus for providing feedback to a person based on a trigger, consistent with disclosed embodiments.

FIGS. 8A-8D illustrate examples of hand-related triggers, consistent with certain disclosed embodiments. FIG. 8A illustrates an example field of view of image sensor 220. In the example of FIG. 8A, a hand of a user, such as user 100, is present within the field of view, and is pointing at an object. In this example, the object is a stoplight, but the object can be any object that may be present in the environment surrounding user 100 while using apparatus 110. In some embodiments, a "pointing" hand trigger as illustrated in FIG. 8A may result in execution of one or more actions relating to the object being pointed at. For example, when user 100 points at a stoplight, as in FIG. 8A, apparatus 110 may detect the action (as will be described below), and audibly announce the status of the stoplight (i.e., "GREEN," "RED," etc.).

In other embodiments, a pointing hand trigger may permit apparatus 110 to perform numerous other actions and/or provide numerous types of information related to an object associated with the pointing hand trigger. Some of those actions include, but are not limited to, announcing the name of a familiar landscape or a familiar object, outputting other information regarding the landscape or object, announcing route information for a public transportation vehicle, audibly reading text, or audibly recognizing a food item or a pharmaceutical. A pointing hand trigger may be used in disclosed embodiments for any action that provides more information about an object within the field of view of apparatus 110. Additionally, in some embodiments, other actions and information may be provided based on an identified object and a hand-related trigger. Some actions may include identifying the value of currency held by a user, determining the difference in the currency and a price of an object, determining time information associated with an object such as the number of minutes remaining until the next bus arrives, as well as numerous other actions contemplated by the present disclosure.

Figure 8B:
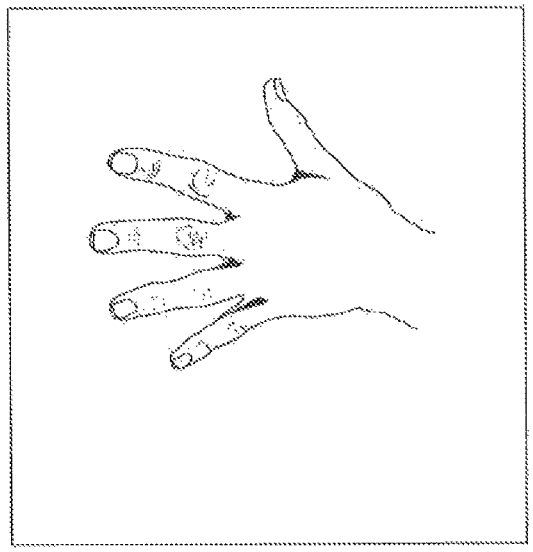
FIG. 8B is an example illustration of a hand-related trigger for an apparatus for providing feedback to a person based on a trigger, consistent with disclosed embodiments.

FIG. 8B illustrates another example field of view of image sensor 220. In the example of FIG. 8B, a hand of a user, such as user 100, is present within the field of view, and is holding an object. In this example, the object is a piece of paper containing text, but the object can be any object that may be present in the environment surrounding user 100 while utilizing apparatus 110. In some embodiments, a "holding" hand trigger as illustrated in FIG. 8B may result in execution of one or more actions relating to the object being held. For example, when user 100 holds a document or any other item containing text, as in FIG. 8B, apparatus 110 may detect the action (as will be described below), and audibly read the text on the document. In other embodiments, a holding hand trigger may permit apparatus 110 to perform other actions, including, but not limited to, announcing the name of a familiar object that is being held, managing database entries for objects (i.e. removing an item as being recognized, editing audible feedback for an item, etc.), or prompting the user to name an item if the held item is an unfamiliar item. A holding hand trigger may be used in disclosed embodiments for any action that provides more information about an object within the field of view of apparatus 110.

Figure 8C:
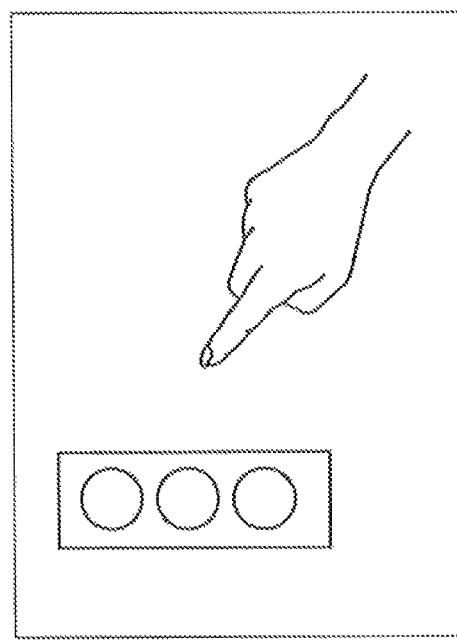
FIG. 8C is an example illustration of a hand-related trigger for an apparatus for providing feedback to a person based on a trigger, consistent with disclosed embodiments.

FIG. 8C illustrates another example field of view of image sensor 220 of apparatus 110. In the example of FIG. 8C, a hand of a user, such as user 100, is present within the field of view, and is waving. In this example, the hand of user 100 is waving in a landscape. In embodiments such as these, a "waving" hand trigger as illustrated in FIG. 8C may result in execution of one or more actions relating to an object or landscape in the field of view when user 100 waves. For example, when user 100 waves at a landscape that is familiar, apparatus 110 may detect elements of the familiar landscape (as will be described below), and audibly identify the location. In other embodiments, a waving hand trigger may permit apparatus 110 to perform other actions, such as prompting the user to identify an unfamiliar landscape when the user waves in an area that apparatus 110 is not familiar with. In some embodiments, waving hand triggers may be associated with pre-programmed landscapes, and landmarks from the landscapes may be stored in memory 550 or database(s) 605. In these embodiments, for example, user 100 may be able to participate in a guided tour of a tourist attraction. In other embodiments, apparatus 110 may be configured to learn landscapes over time by prompting user 100 for information. A waving hand trigger may be used in disclosed embodiments for any action that provides more information about an object within the field of view of apparatus 110.

Figure 8D:
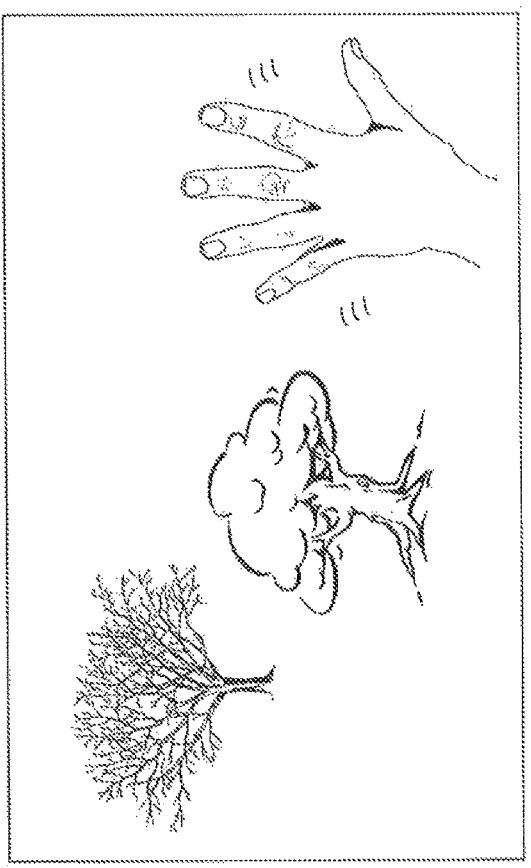
FIG. 8D) is an example illustration of a hand-related trigger for an apparatus for providing feedback to a person based on a trigger, consistent with disclosed embodiments.

FIG. 8D illustrates another example field of view of image sensor 220 of apparatus 110. In the example of FIG. 8D, a hand of a user, such as user 100, is present within the field of view, and is outstretched in a "stop sign" position. In embodiments such as these, a "stop" hand trigger as illustrated in FIG. 8D may result in execution of one or more actions relating to an object or landscape in the field of view when user 100 presents their hand in this manner. For example, when user 100 presents a stop sign hand trigger during any ongoing operation or action associated with apparatus 110, the apparatus may be configured to immediately terminate the ongoing operation. In other embodiments, the stop sign hand trigger may serve as a "reset" for apparatus 110, or may be configured to help present user 100 with information about the status of the apparatus. In some embodiments, the stop sign hand trigger may serve to lock the user's home and/or turn on an alarm system, or perform any other of numerous actions based on a desired configuration.

The above described hand-related triggers and the associated actions are provided by way of example only. In some embodiments, the identified hand-related triggers may be pre-defined or programmed based on a user's particular preference and/or to perform any number of beneficial actions in addition to or alternative to the above. Additionally, the actions associated with any one or more recognizable hand-related triggers may also be pre-defined or programmed based on a user's particular preference.

Other possible hand-related triggers and variations or combinations of the above-described hand-related triggers are also contemplated by the present disclosure. For example, any configuration of a hand or manipulation of the fingers of a hand or other hand gestures may serve as a hand-related trigger. For example, any recognizable configuration of a hand may serve as a trigger, including a fist, one or more splayed fingers, or any other repeatable and recognizable positioning or manipulation of the fingers to form a gesture may also serve as a trigger. In some embodiments, both hands may be controlled or manipulated to function as a hand-related trigger. Additionally, any recognizable configuration of a hand and/or determined movement of the hand may also serve as a hand-related trigger. For example, in some embodiments, a hand-related trigger may comprise an erratic or atypical movement of the wrist or hand or of an object associated with the hand. Other recognizable hand movements, such as motion in a circular pattern, or movement or swiping in an up and down or sideways pattern or any other recognizable pattern may serve as a hand-related trigger.

Additionally, in some embodiments, a hand-related trigger may be defined by a dwell time, such as a predefined duration (e.g. 0.5, 1, 2, 3 seconds, etc.) for which a hand-related trigger is identified in the image data. In some embodiments, one or more of the above-described hand-related triggers may be combined to form a hand-related trigger. Other analysis of a hand-related trigger may also be performed. For example, in some embodiments, processor 210 or 540 may identify a particular orientation of a user's hand such as recognition of a palm or the backside of a hand, as well whether the hand is a left or right hand.

In some embodiments, a determination as to whether to perform an action based on an identified hand-related trigger may be made based on a confidence score applied to one or more of the identified hand-related triggers. For example, in some embodiments, an action may be executed and/or feedback of information to a user 100 may be performed if a confidence score meets or exceeds some predetermined threshold. In some embodiments, the confidence score may be based on a degree of certainty that the hand that is detected in the analyzed image data corresponds to a hand-related trigger. Certain of the above described hand-related triggers may correspond to a greater confidence score based on the nature of the hand-related trigger. For example, in the embodiments shown in FIG. 8A the presence of a hand manipulated with a pointing finger and an associated object may correspond to a greater confidence score than detection of a hand portion by itself. Additionally, hand triggers that include a configuration of the hand and a particular movement may also correspond to a higher confidence score than a trigger associated with a hand configuration and no movement. A confidence score for one or more of the above described hand-related triggers may be combined when the triggers are identified within a set period of time, for example. Other contextual information analyzed in the image data or other external information such as an audible trigger may also be taken into consideration when determining a confidence score for a detected hand-related trigger.

In the disclosed embodiments, the detection of any of a variety of hand-related triggers of a user 100 of apparatus 110 may result in an associated action or set of actions. In some embodiments, apparatus 110 may include additional capability to distinguish between a hand-related trigger of a user 100 of apparatus 110 and a hand-related trigger associated with a person other than the user 100 so as to provide feedback to a user based on triggers associated with the user 100. In some environmental situations, it may be beneficial to distinguish between a hand-related trigger associated with a user 100 and a person other than the user. For example, in some situations where user 100 is interacting closely with another person in a meeting or in conversation, or other situations, such as on public transportation or in a grocery store where user 100 is closely positioned near one or more other persons, systems without the ability to distinguish between a hand-related trigger of user 100 and a person other than the user may provide unintended or unwanted feedback to a user based on triggers not associated with the user. Thus, in some embodiments, processor 210 or 540 may perform an action or provide feedback that is determined to be intended by user 100 based on a determination that the hand-related trigger is associated with user 100.

In some embodiments, additional processing to identify whether the hand-related trigger is associated with user 100 may be performed in particular situations in which other persons are present. Processor 210 or 540 may determine whether a current situation involves one or more persons other than a user based on analyzed image data or other external data. For example, when one or more other persons are detected in analyzed image data, processor 210 or 540 may perform additional analysis to determine whether a hand-related trigger is associated with a user 100. In these situations, when a detected hand-related trigger is determined to be associated with a person other than the user 100 of apparatus 110, it may be beneficial to selectively withhold or forgo performing any action that may otherwise result from the detected hand-related trigger.

Figure 8E:
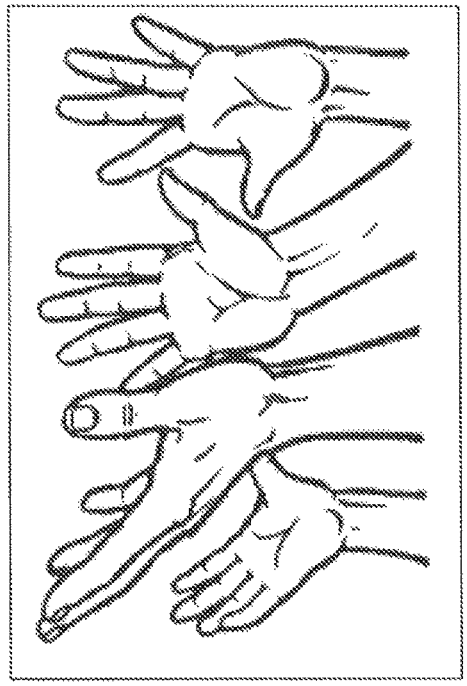
FIG. 8E is an example illustration of a hand-related trigger associated with a person other than the user of an apparatus for providing feedback to a person based on a trigger, consistent with disclosed embodiments.
Figure 8F:
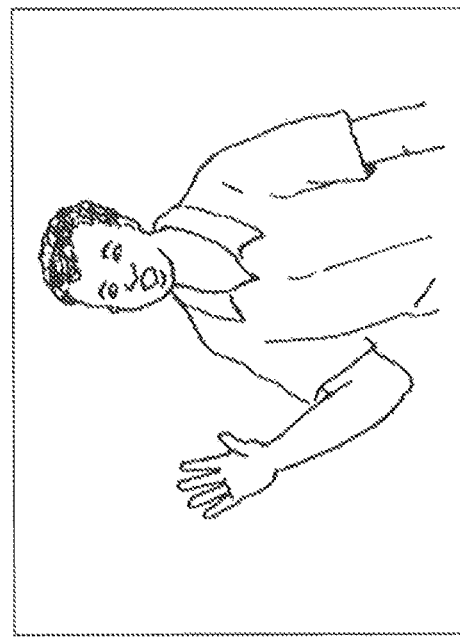
FIG. 8F is an example illustration of a hand-related trigger associated with a person other than the user of an apparatus for providing feedback to a person based on a trigger, consistent with disclosed embodiments.
Figure 8G:
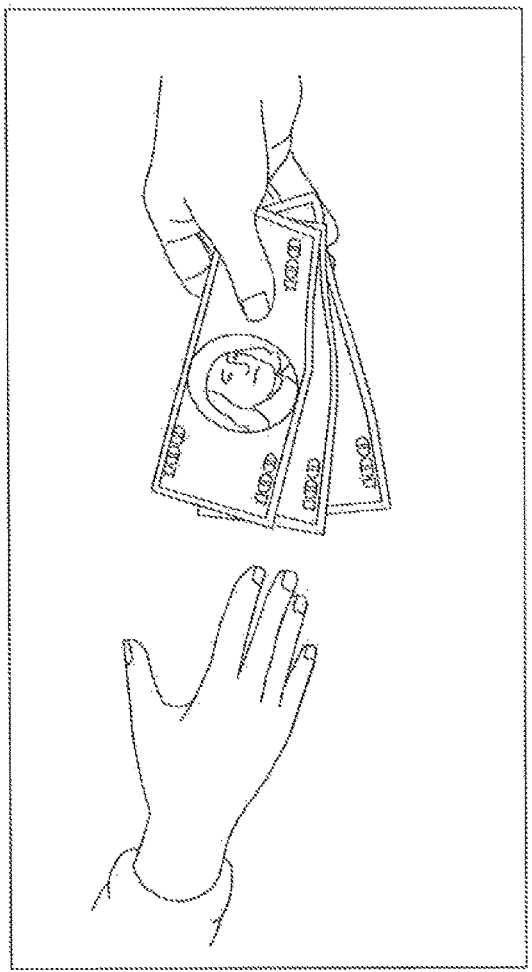
FIG. 8G is an example illustration of a hand-related trigger associated with a person other than the user of an apparatus for providing feedback to a person based on a trigger, consistent with disclosed embodiments.

FIGS. 8E-8G illustrate examples of identified hand portions related to a hand-related trigger associated with persons other than a user of apparatus 110, consistent with certain disclosed embodiments. For example, as shown in FIG. 8E, one such hand-related trigger may include a raised hand of one or more persons in an environment for hailing a cab on the street; waving to another person or getting someone's attention. In many environmental situations, a user 100 of apparatus 110 may be closely positioned near or in the vicinity of other individuals such that another person's hand (i.e. not the user's hand) may be in the field of view of user 100 and may be motioned similar to a known hand-related trigger.

Other hand-related triggers associated with another person are shown in FIG. 8F. As shown in FIG. 8F, a hand of one or more persons other than the user 100 of apparatus 110 may be detected in the field of view of user 100. In some embodiments, a hand of the other person may be in close proximity to user 100, as shown. For example, one or more hand portions in close proximity may be detected at a concert or sporting event or other event when user 100 is part of a crowd of people. Many other situations are contemplated in which one or more hand-related triggers associated with a person other than the user 100 may be detected in the field of view of user 100. For example, any situation where user 100 is interacting with another person in a meeting or in conversation, or other situations, such as on public transportation or in a grocery store, where user 100 is closely positioned near one or more other persons could provide a situation in which it is beneficial to forgo an unintended action based on an identified hand-related trigger of a person other than user 100.

In some situations, such as one shown in FIG. 8G, a hand of user 100 may be identified in the field of view of image sensor 220 along with the hand of a person other than user 100. In these situations, it may also be beneficial to determine whether one or more of the identified hands is associated with a hand-related trigger performed by user 100 and determine whether to forgo an action based on the identified hand portions. For example, in the situation shown in FIG. 8G, user 100 associated with apparatus 110 may be holding currency with his right hand and offering the currency to another person whose hand is shown on the left side of the Fig. Similar to the embodiments described above with respect to FIGS. 8A and 8B, in some situations, user 100 may intend to perform an action or receive feedback regarding the value of the held currency, based on a hand-related trigger. The hand-related trigger may be associated with holding the currency in the field of view of image sensor 220 as shown (similar to FIG. 8B) or may also include a pointing hand trigger pointing to the currency. In the situation shown in FIG. 8, however, user 100 may not intend for apparatus 110 to perform an action associated with a hand-related trigger. Thus, in some embodiments, apparatus 110 may recognize the presence of a hand belonging to a person other than user 100 and determine whether to forgo action based on the identified hand and/or a determined context. In some embodiments, the hand of a person other than user 100 may be positioned or configured as a known hand-related trigger, but because the hand is determined to belong to a person other than user 100, no hand-related trigger action is to be performed. In some embodiments, an action may be withheld based on the identification of a hand other than that of a user 100, whereas in other embodiments, the identification of a hand other than user 100 may affect a confidence score used to determine whether to perform an action associated with the identified hand-related trigger.

In some embodiments, as discussed below with respect to FIG. 9, it may thus be beneficial to determine whether a hand-related trigger is associated with a user 100 before determining whether to perform a particular action.

Figure 9:
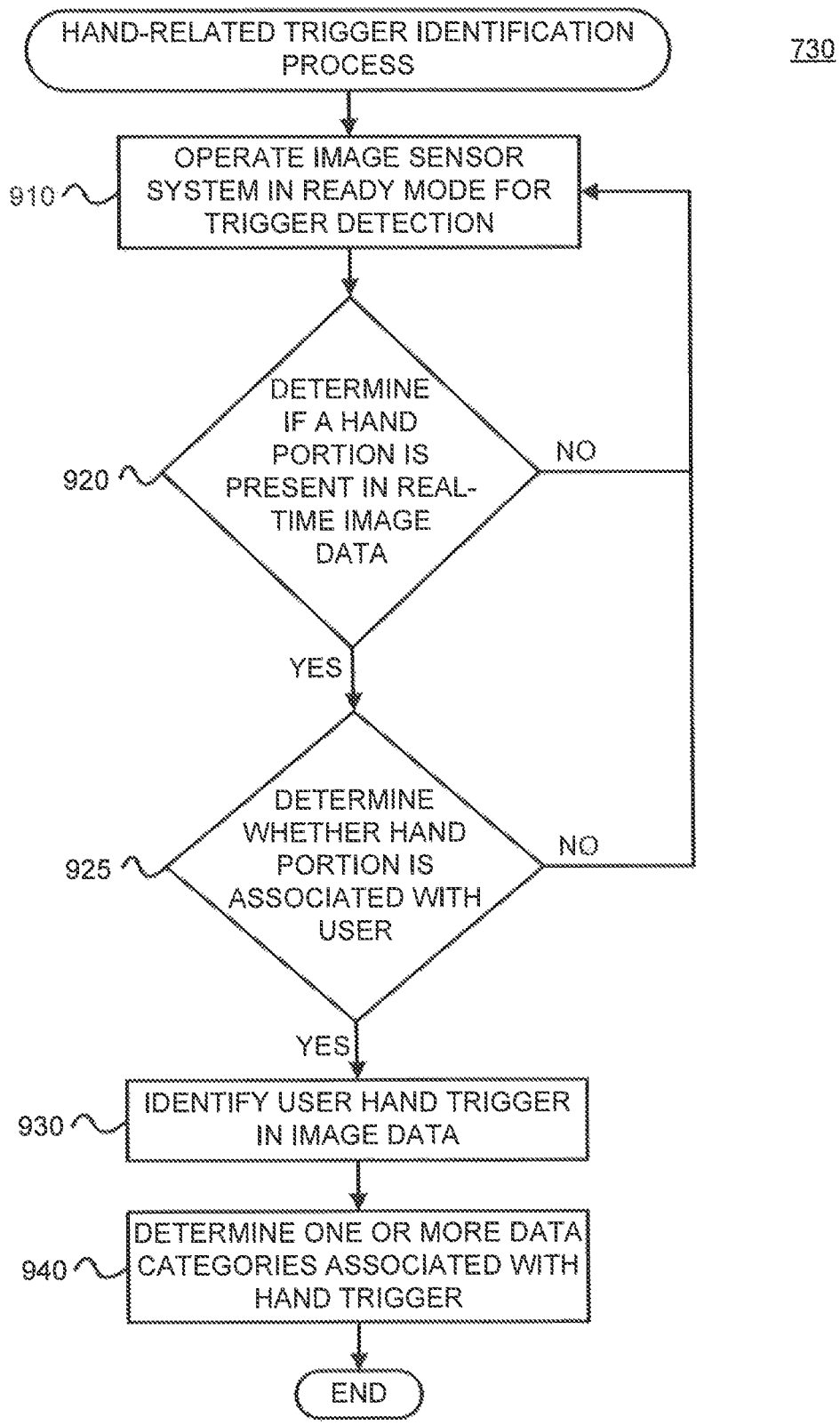
FIG. 9 is an example of a hand-related trigger identification process, consistent with disclosed embodiments.

FIG. 9 illustrates an example hand-related trigger identification process such as that described above in association with Step 730 of process 700 consistent with certain disclosed embodiments. Process 730, as well as any or all of the individual steps therein, may be performed by various aspects of device 110, computing device 120, or any subcomponents therein. For exemplary purposes, FIG. 9 is described as being performed by processor 210 or 540, executing software instructions stored within memory 550.

Processor 210 or 540, via trigger identification module 602, may operate image sensor 220 in a normal manner, or "ready mode," while awaiting trigger detection (Step 910). In some embodiments, apparatus 110 may be configured to always operate in a ready mode when no operations are active. In other embodiments, user 100 may be able to place apparatus 110 into a ready mode such that a hand trigger (or any external trigger, visible or auditory) may be detected.

While in ready mode, trigger identification module 602 may determine if at least a portion of a hand is present in the real-time image data (Step 920). The hand may correspond to the hand of user 100 or the hand of another person. In some embodiments, trigger identification module 602 may be configured to recognize the particular hand of the user 100 that is operating apparatus 110. In these embodiments, apparatus 110 may initially prompt user 100 to mime various hand triggers. Trigger identification module 602 may capture images of the user's hand and various hand triggers and store them in one or both of memory 550 or database(s) 605 for ready recognition in the future. In alternative embodiments, trigger identification module 602 may not be configured to recognize a particular hand, and may be preconfigured to recognize any hand, similar appendage, or equivalent substitute. In some embodiments, trigger identification module 602 may be configured to recognize the shape of a hand when it is covered in a glove, mitten, or other covering.

If no hand is detected as present in the real-time image data (Step 920: NO), trigger identification module 602 may configure image sensor 220 to continue to operate in ready mode, waiting for a future trigger. If a hand is determined to be present (Step 920: YES), then trigger identification module 602 may determine if the hand is associated with the user 100 of apparatus 110 (Step 925). In some embodiments, Step 925 may include determining from the analyzed image data whether one or more other persons may be present. For example, in some situations where it may be determined that the user 100 is alone, additional image processing in Step 925 may be selectively bypassed.

In some embodiments, as part of step 925, trigger identification module 602 may analyze the captured image data to determine whether the identified hand is associated with user 100. Trigger identification module 602 may consider a number of image data aspects and features for the determination consistent with the disclosed embodiments, including identifying whether the hand matches that of stored images of a user's hand, identifying a context or orientation of the detected hand, assessing the environment for the presence of others, determining whether the hand is associated with a body in the field of view, determining an amount of space that the detected hand portion occupies in an image, and determining a distance of the detected hand from the apparatus 110. A determination may also be made based on one or more other criteria, including, for example, a confirmation or rejection signal from user 100, or other external information such as an auditory signal, as well as historical information regarding the environmental situation or other learned and/or programmed assessments of the situation. In some embodiments, a determination as to whether the identified hand is associated with user 100 may be a multiple step process beginning with a threshold determination, for example, and then additional image analysis if necessary.

In some embodiments, trigger identification module 602 may determine whether a detected hand region is associated with user 100 based on whether the detected hand region occupies a threshold amount of space in at least one image of the analyzed image data. The threshold amount of space may be predefined or learned and programmed based on a number of test images of a hand of user 100, for example. In some embodiments, the predefined threshold of space that a user's hand occupies in an image to be associated with user 100 may be defined as at least ten percent or twenty percent (or more) of the image. Other thresholds may be used based on various characteristics of user 100, such as size or age. In some embodiments, a threshold amount of space may be based on a predefined or learned hand-related trigger.

Additionally, a size of the detected hand may also be determined to identify whether the hand is associated with user 100. A size of the hand may be based on the relative size of the detected hand portion in comparison to an anticipated size. In some embodiments, a size of the detected hand portion may be based on the relative size of the detected hand in comparison with a known size of one or more other detected objects identified in the field of view, such as a car, a sign, a product, a tree, a landmark, or the figure of a person, etc. In some embodiments, the comparison may be based on information known regarding the identified objects stored in database 605, for example. In another embodiment, the determination may be based on a distance of the detected hand from user 100. Trigger identification module 602 may determine an approximate distance of the detected hand from apparatus 110 based on the comparison with known sizes of other objects. Numerous other ways of determining a distance of a hand region away from a user are contemplated by the present disclosure.

Other image processing techniques based on known parameters of image sensor 220 may also be used to determine the size and distance of the detected hand from the image sensor 220. Additionally, in some embodiments in which a first image sensor 220*a* and a second image sensor 220*b* (such as shown in FIG. 5B) are implemented, the image data from the two image sensors may be analyzed using known techniques to determine the distance of the detected hand from the image sensor. Other known techniques based on an infrared proximity sensor or other optical distance sensors, and/or an ultrasonic distance sensor, for example, may also be used to determine the distance of a detected object from the sensor. For example, any known sensor technology for determining distance based on a reflected or received signal may be implemented in apparatus 110.

When the amount of space occupied by the hand portion or the size of a hand portion is less than a predetermined threshold or an approximate distance of the hand portion meets or exceeds a predetermined threshold, trigger identification module 602 may determine that the detected hand is associated with a person other than user 100 (Step 925: NO). As a result, trigger identification module 602 may withhold or forgo any action based on the detected trigger and return to Step 910 such that image sensor 220 continues to operate in ready mode, waiting for a future trigger. Thus, in some embodiments, trigger identification module may selectively execute certain actions based on a determination that a detected hand trigger is associated with a user 100.

In some embodiments, trigger identification module 602 may perform additional image analysis to determine whether a detected hand is associated with user 100 when the detected hand corresponds to or exceeds a threshold percentage (e.g., ten percent, twenty percent, thirty percent, forty percent, fifty percent, or more, etc.) of the entire field of view, or a size of the hand portion exceeds a size threshold, or a determined distance is less than a threshold. For example, with respect to FIG. 8E, trigger identification module 602 may initially determine that identified hand portion does not meet a required threshold percentage to be associated with user 100 and no further analysis may be performed. With respect to FIGS. 8F and 8G, however, the identified hand portions may meet or exceed a threshold for being associated with user 100, based on a size of a hand portion or the percent of entire field of view occupied by a hand portion. In these situations, trigger identification module 602 may perform additional image analysis to determine whether the identified hand portions are associated with user 100.

In some embodiments, trigger identification module 602 may determine whether a detected hand portion is associated with a body in the field of view of image sensor 220. For example, trigger identification module 602 may determine that the detected hand portion is associated with a person other than user 100 if it is determined that the hand is associated with a body other than the user's. In some embodiments, even though the detected hand is associated with a person other than user 100, trigger identification module 602 may proceed under the "YES" determination of Step 925 based on an identified identity and/or familiarity of the detected person or based on other learned situations.

Trigger identification module 602 may also determine whether the detected hand portion matches that of stored images of a user's hand. In some embodiments, the determination may be based on identifying various features of a user's hand as may be determined based on a comparison with stored images of the user's hand. The stored images of the user's hand may include a plurality of images of the user's hand from various angles or in different positions, including positions or manipulations associated with one or more hand-related triggers. Some identifying features may include the general appearance of the user's hand, as well as the presence of a ring on a particular finger, a tattoo, or a bracelet or wristwatch or other object typically associated with user 100 or characteristic identifying user 100. Other image analysis may be performed to identify a context or orientation of the detected hand portion to determine whether such a context or orientation may be consistent with a user 100. For example, with respect to FIG. 8G, trigger identification module 602 may determine that the hand portion shown in the left side of the FIG. 8G is not positioned at an orientation that would be natural for user 100. As such, based on the image analysis, trigger identification module 602 may determine that the hand portion shown in the left side of FIG. 8G is not associated with user 100.

The above techniques for determining whether a user's hand is identified in analyzed image data are exemplary only. Other similar techniques for identifying a user's hand are contemplated by the present disclosure. In some embodiments, one or more of the above techniques may be combined to determine whether an identified hand portion is associated with user 100. In some embodiments, trigger identification module 602 may apply a weighting or confidence score to a particular analysis to aid in the determination. For example, any one or more image analysis techniques as described above (or similar to those described) may be performed to determine whether a hand portion is associated with user 100. The result of an analysis may be associated with a weight or confidence score corresponding to the likelihood that the outcome of the analysis may be determinative. In some embodiments, a confidence score may be based on the results of one or more determinations. If a confidence score is met or exceeded, trigger identification module 602 may determine that the identified hand portion belongs to a person other than user 100.

If trigger identification module 602 determines that the detected hand portion is associated with the user 100 of apparatus 110 (Step 925: YES) then trigger identification module 602 may determine if the hand is performing a recognized hand-related trigger gesture (Step 930). For example, a hand-related trigger gesture may be defined by a position of the hand in the field of view, as well as a formation of or manipulation of the fingers of the hand. In some embodiments, a hand-related trigger gesture may include a pointing trigger pointing to an object. Examples of possible hand-related triggers are discussed above in association with FIGS. 8A-8D, but additional hand actions may be recognized by trigger identification module 602. In some embodiments, as discussed above, a hand-related trigger may comprise an erratic or atypical movement of an object associated with the hand. For example, the hand of user 100 may point and track an erratic or atypically moving object, or may be holding an object, and waving it in an erratic or atypical manner. Trigger identification module 602 may interact with database comparison module 604 to search a database, such as database 605, for recognized hand triggers and objects associated with a hand-related trigger. As similarly discussed above, trigger identification module 602 may determine whether a hand-related trigger is present based on a confidence score associated with the identified hand-related image data.

The identified user hand-related trigger may then be used to determine one or more data categories associated with the determined hand-related trigger (Step 940). For example, processor 210 or 540 may determine context information associated with the environment surrounding user 100, and may, along with the determined hand-related trigger, use the information to determine particular categories to search. For example, user 100 may be standing at an intersection desiring to cross the street. Apparatus 110 may detect this scenario as the current setting. Processor 210 or 540 may perform a variety of different alternative actions (via action execution module 603) based on a particular hand-related trigger recognized by trigger identification module 602. For example, one type of hand-related trigger may signal to trigger identification module 602 that the category to search for is "warning of risks." As will be discussed further below, apparatus 110 may then scan the field of view for objects and then scan the database for matching objects that may represent risks to user 100. In some embodiments, multiple categories may be associated with a given hand trigger in a given context. For example, in the scenario just described, warning of risks may comprise a first category, and a second category may be "scene identification." Numerous combinations of categories are contemplated for various triggers and contexts. For example, in an alternative embodiment, "spatial guidance" may be the first category, and "warning of risks" may be the second category. Categories may be fluid based on current configuration of apparatus 110 at any given time. In some embodiments, the category may be based on the determination that the detected hand-related trigger is associated with another person familiar to user 100. One skilled in the art may contemplate many possible categories of data and contexts in which they could be invoked or sorted.

While process 730 of FIG. 9 illustrates determination of whether a hand portion is associated with user 100 (Step 925) prior to identifying the user hand-related trigger (Step 930), in some embodiments, the steps may be arranged in a different order. For example, a determination whether a hand-related trigger is present may be made prior to analyzing whether a detected hand portion is associated with user 100. In some embodiments, the steps may be combined such that determination as to whether a detected hand portion is associated with a user 100 may be used to calculate a confidence score to determine whether a hand-related trigger is present in the image data. For example, where one or more other persons are identified in the image data, a confidence score for any hand-related trigger may be adjusted (or the threshold may be adjusted), such that a greater confidence is needed to perform an action associated with an identified hand-related trigger.

Figure 10:
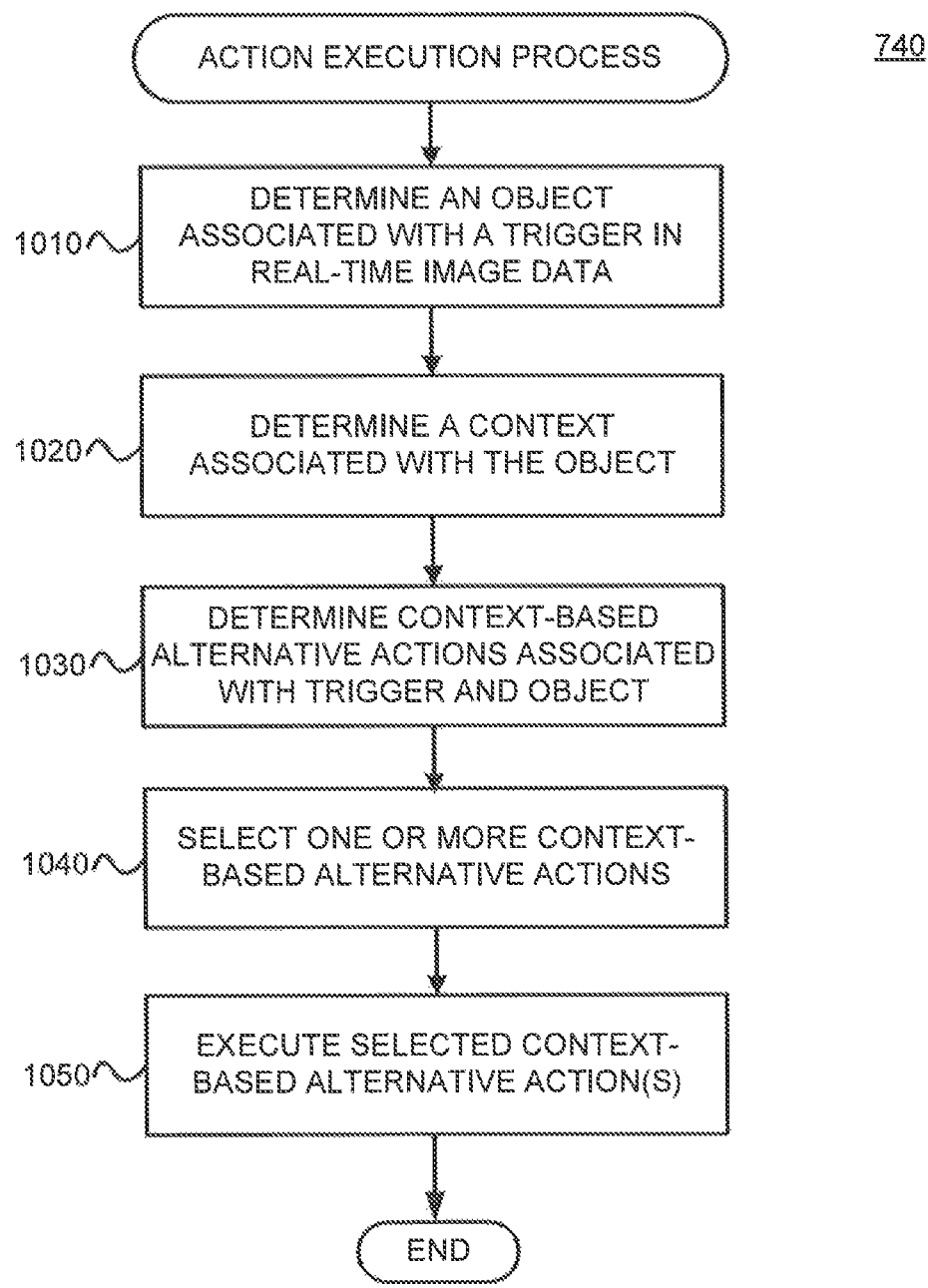
FIG. 10 is an example of an action execution process, consistent with disclosed embodiments.

FIG. 10 illustrates an example action execution process such as that described above in association with Step 740 of process 700 consistent with certain disclosed embodiments. Process 740, as well as any or all of the individual steps therein, may be performed by various aspects of device 110, computing device 120, or any subcomponents therein. For exemplary purposes, FIG. 10 is described as being performed by processor 210 or 540, executing software instructions stored within memory 550.

Processor 210 or 540, via trigger identification module 602 and action execution module 603, may determine an object associated with a trigger in real-time image data received from image sensor 220 (Step 1010). In some embodiments, the trigger may be a hand-related trigger that may be identified and processed using hand-related trigger identification process 730 described above. In other embodiments, other triggers may be identified and processed by trigger identification module 602, such as the appearance of a particular object into the field of view of apparatus 110, including the figure of a person known to user 100. In these embodiments, trigger identification module 602 may be configured to automatically identify and process the trigger when it appears. Alternatively, trigger identification module 602 may be configured to identify and process the trigger when user 100 focuses on the object using apparatus 110. In some embodiments, trigger identification module 602 may be configured to identify and process multiple triggers substantially simultaneously within the same field of view.

Once trigger identification module 602 has identified and processed the relevant triggers present in the real-time image data, trigger identification module 602 and database comparison module 604 may determine one or more objects associated with the triggers. In some embodiments, database(s) 605 may contain database entries linking particular objects to triggers, and database comparison module 604 may be configured to search database(s) 605 given the input of a particular trigger to find associated objects that are present in the received real-time image data. In other embodiments, database comparison module 604 may take the reverse approach, and may identify one or more objects present in the received real-time image data, then search database(s) 605 for matching triggers. Database comparison module 604 may identify one or more trigger-object matches within database(s) 605, and may extract data relating to those pairings for further analysis and processing consistent with disclosed embodiments.

Processor 210 or 540, via trigger identification module 602, action execution module 603, and database comparison module 604, may determine a context associated with the identified objects (Step 1020). In some embodiments, processor 210 or 540 may determine an object context based on real-time image data received from image sensor 220. In other embodiments, processor 210 or 540 may determine an object context based on real-time audio data received from image sensor 220. In some embodiments, apparatus 110 may recognize a familiar context associated with the object based on prior experience, or based, for example, on context information pre-programmed into memory 550 or database(s) 605. In these embodiments, database comparison module 604 may identify known and familiar contexts associated with objects and triggers within database(s) 605. Alternatively, the context determined from the image sensor data may not be recognized or familiar, and processor 210 or 540 may prompt user 100 to provide information relating to the context via an audio prompt or via a user interface visible to user 100 within the field of view of apparatus 110. Apparatus 110 may receive the context information in these embodiments from user 100, and then database comparison module 604 may use the received information to search database(s) 605 or other sources for relevant entries.

Additionally, processor 210 or 540 may call action execution module 603 to determine one or more context-based alternative actions associated with the chosen category or categories, and their associated triggers and contexts (Step 1030). In some embodiments, action execution module 603 performs such alternative actions in addition to any feedback generated by feedback generation module 601. In other embodiments, the alternative actions are performed instead of the feedback generation.

One skilled in the art may contemplate a multitude of alternative actions that may be associated with a given object or objects and an identified hand-related trigger for a given context. Alternative actions may include, but not be limited to, audibly reading text, sending an electronic message or instant message over the Internet; configuring settings for apparatus 110 or image sensor 220; activating a user interface, which may appear on the lens of a glasses unit 130 within the vision of user 100 and provide additional interactivity options, announcing an identity of an inanimate object, announcing an identity of an individual, identifying a scene perceived within the field of view, summing money, monitoring a status of a traffic light (as illustrated, for example, in FIG. 8A), saving an individual's name, audibly reading a summary of text, monitoring an object expected to change, identifying a bus number, identifying currency, identifying a credit card, or identifying a pharmaceutical product, such as a pill. Numerous other beneficial actions may also be performed alternative to or in addition to the above.

Various alternative actions available for execution by action execution module 603 may be stored in database entries within database(s) 605 associated with various objects, contexts and triggers. In these embodiments, processor 210 or 540 may call database comparison module 604 to access and extract possible alternative actions, then transmit the possible actions to action execution module 603 for execution. When more than one object or trigger are visible, processor 210 or 540 may determine their relative locations to determine one or more possible alternative actions to execute.

Action execution module 603 may select one or more of the context-based alternative actions presented for execution (Step 1040). In some embodiments, action execution module 603 may select a single alternative action for execution based on the context or lack of context. In other embodiments, action execution module 603 may select multiple alternative actions. In these embodiments, one or more of the alternative actions may be sequential; for example, an alternative action may only be executed if another particular action is executed beforehand. Upon selecting one or more of the alternative actions, action execution module 603 may execute various software instructions to perform the action (Step 1050).

For example, if the action involves an audible output to user 100, action execution unit 603 may employ feedback generation module 601 and feedback-outputting unit 230 or 545 to generate, configure, and output the audible information, as will be discussed in further detail below. In some embodiments, processor 210 or 540 may be configured to rapidly adjust the alternative actions available to action execution module 603 based on changes that may be identified in one or more of a trigger, an identified object, or a context related to the object. In these embodiments, as these elements change, processor 210 or 540 may call database comparison module 604 to search database(s) 605 for new alternative actions associated with the newly-changed trigger, object, or context.

As a non-limiting example of an automatic action selection process, such as that described above in association with FIG. 7, apparatus 110 may determine that a hand-related trigger is present and that the hand-related trigger is associated with user 100, such as a portion of user 100's hand holding an object. After identifying the trigger, trigger identification module 602 may further identify the object that user 100 is holding as a stack of currency, such as is shown in FIG. 8G. Database comparison module 604 may then search database(s) 605 or other information sources for possible contexts involved with the particular trigger (hand-related; holding) and the object (currency). Database comparison module 604 may determine possible contexts, such as needing to identify the type or amount of the currency to pay for a purchase. Database comparison module 604 may then determine one or more alternative actions associated with the trigger, the object, and the context. Here, database comparison module 604 may determine that alternative actions may include audibly announcing the face value of the currency, audibly announcing the type or national origin of the currency, or audibly summing the amount of the currency. The alternative actions may optionally be performed sequentially; for example, the currency might not be summed until apparatus 110 determines the type of currency first. Upon determining the possible alternative actions, database comparison module 604 may pass the possible actions to action execution module 603, which may select and execute one or more of the actions. Action execution module 603 may execute software instructions to determine the type of currency, sum the currency, then generate, configure, and output audible or visible announcements of the currency type and amount via feedback generation module 601 and feedback-outputting unit 230 or 545. This process will now be described in further detail.

Figure 11:
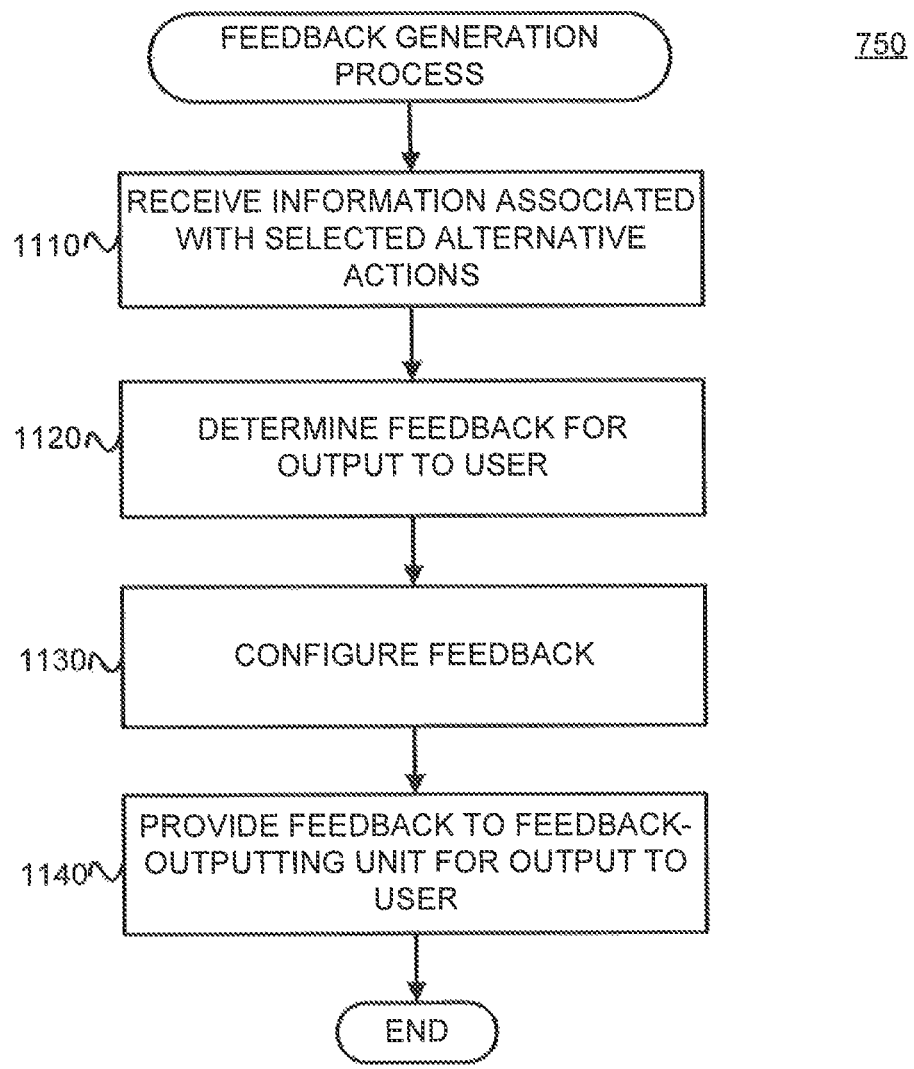
FIG. 11 is an example of a feedback generation process, consistent with disclosed embodiments.

FIG. 11 illustrates an example feedback generation process such as that described above in association with Step 750 of process 700 consistent with certain disclosed embodiments. Process 750, as well as any or all of the individual steps therein, may be performed by various aspects of device 110, computing device 120, or any subcomponents therein. For exemplary purposes, FIG. 11 is described as being performed by processor 210 or 540, executing software instructions stored within memory 550.

As discussed above, processor 210 or 540, via feedback generation module 601, may receive information associated with one or more identified objects that have been determined to be present in the environment surrounding user 100 (Step 1110). The received information may further comprise information relating to a result of one or more executed alternative actions, as discussed above. Based on the received information, feedback generation module 601 may determine a desired feedback for output to user 100 (Step 1120). The feedback may include any one or more of audible, visible, tactile, or other type of feedback consistent with the disclosed embodiments. In some embodiments, the identified object or executed alternative action may each already be associated with an audible or visible feedback file stored in memory 550 or database(s) 605. In these embodiments, feedback generation module 601 may simply access the existing associated audible feedback file and prepare it for transmission. In other embodiments, there may be multiple audible feedback files associated with the identified object(s) or selected alternative actions, and feedback generation module may review the determined trigger and/or context information to determine the correct associated audible feedback to output to user 100. In still other embodiments, there may be no existing audible feedback file associated with the identified object(s) or selected actions. In these embodiments, feedback generation module 601 may determine content for audible or visible feedback by prompting user 100 for the feedback, or may infer proper audible feedback, based on context and based on other objects within the category.

After determining the proper feedback to use, feedback generation module 601 may configure the feedback into a readable format, if necessary (Step 1130), then provide the feedback to feedback-outputting unit 230 or 545 for output to user 100 (Step 1140). Feedback generation module 601 may provide the feedback to feedback-outputting unit 230 or 545 via an electrical connection, or alternatively, via wireless transceiver(s) 530. In some embodiments, feedback-outputting unit 230 or 545 may be associated with a display (such as 260 shown in FIG. 5C) and configured to provide instructions to output visible feedback on the display.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A wearable apparatus for selectively disregarding triggers originating from persons other than a user of the wearable apparatus, the wearable apparatus comprising:
   a wearable image sensor configured to capture image data from an environment of the user of the wearable apparatus; and
   at least one processing device programmed to:
   receive the captured image data;
   identify in the image data a trigger, wherein the trigger is associated with at least one action to be performed by the wearable apparatus;
   identify, in the image data, at least a part of a body of a person other than the user of the wearable apparatus;
   identify, in the image data, at least a part of a body of the user based on one or more characteristics of the user;
   determine, based on the image data, that the trigger identified in the image data is associated with the body of the person other than the user of the wearable apparatus, by determining a confidence score associated with the identified trigger, wherein the confidence score is based in part on the presence of the at least a part of the body of the user; and
   forgo performance of the at least one action if the trigger identified in the image data is determined to be associated with the body of the other person, based on the confidence score being lower than a threshold.

2. The wearable apparatus of claim 1, wherein the trigger is a hand-related trigger identified by at least a portion of a hand, and the at least one processing device is further programmed to determine, as part of determining whether the trigger identified in the image data is associated with the body of the person other than the user, whether the portion of the hand belongs to the person other than the user of the wearable apparatus.

3. The wearable apparatus of claim 2, wherein determining that the portion of the hand belongs to the person other than the user includes determining whether a size of the hand portion in a field of view of the image sensor meets or exceeds a threshold.

4. The wearable apparatus of claim 2, wherein determining that the portion of the hand belongs to the person other than the user includes determining whether the hand is associated with the body identified in the image data.

5. The wearable apparatus of claim 2, wherein determining that the portion of the hand belongs to the person other than the user includes comparing the portion of the hand with stored images of a hand of the user of the wearable apparatus.

6. The wearable apparatus of claim 2, wherein determining that the portion of the hand belongs to the person other than the user includes determining an orientation of the portion of the hand.

7. The wearable apparatus of claim 1, wherein the trigger is a hand-related trigger identified by at least a portion of a hand moving in an erratic according to a predetermined motion.

8. The wearable apparatus of claim 1, wherein the trigger is a hand-related trigger identified by at least a portion of a hand configured with an index finger pointing toward an object.

9. The wearable apparatus of claim 1, wherein the confidence score is determined in part from one or more analyses of the image data including the trigger.

10. The wearable apparatus of claim 1, wherein determining whether the trigger identified in the image data is associated with the body of the person other than the user of the wearable apparatus is performed responsive to identifying at least a part of the body of the person other than the user or the wearable apparatus.

11. The wearable apparatus of claim 1, wherein the at least one action to be performed by the wearable apparatus includes at least one of: announcing an identity of an inanimate object, announcing an identity of an individual, scene identification, summing money, monitoring a status of a traffic light, saving an individual's name, audibly reading text, audibly reading text summary, monitoring an objected expected to change, identifying a bus number, identifying currency, identifying a credit card, and identifying a pill.

12. The wearable apparatus of claim 1, wherein the wearable image sensor is configured to capture real-time image data and the at least one action associated with the trigger is performed in real-time.

13. The wearable apparatus of claim 1, wherein identifying in the image data a trigger includes determining whether a potential trigger meets or exceeds a confidence threshold, the confidence threshold being based on the body of a person other than the user of the wearable apparatus being identified in the image data.

14. A wearable apparatus for selectively disregarding hand-related triggers originating from persons other than a user of the wearable apparatus, the wearable apparatus comprising:
   a wearable image sensor configured to capture image data from an environment of the user of the wearable apparatus; and at least one processing device programmed to:
identify in the image data a hand-related trigger, wherein the hand-related trigger is associated with at least one action to be performed by the wearable apparatus;
identify, in the image data, at least a part of a body of a person other than the user of the wearable apparatus;
identify, in the image data, at least a part of a body of the user based on one or more characteristics of the user;
determine, based on the image data, that the hand-related trigger identified in the image data is associated with at least a portion of a hand belonging to the person other than the user of the wearable apparatus by determining a confidence score associated with the identified trigger, wherein the confidence score is based in part on the presence of the at least a part of the body of the user; and
forgo performance of the at least one action if the hand-related trigger identified in the image data is determined to be associated with at least a portion of a hand belonging to the other person, based on the confidence score being lower than a threshold.

15. The wearable apparatus of claim 14, wherein determining whether the hand-related trigger identified in the image data is associated with at least a portion of a hand belonging to the person other than the user of the wearable apparatus includes determining whether a size of the hand portion in a field of view of the image sensor meets or exceeds a threshold.

16. The wearable apparatus of claim 14, wherein determining whether the hand-related trigger identified in the image data is associated with at least a portion of a hand belonging to the person other than the user of the wearable apparatus includes determining whether the hand is associated with the body identified in the image data.

17. The wearable apparatus of claim 14, wherein determining whether the hand-related trigger identified in the image data is associated with at least a portion of a hand belonging to the person other than the user of the wearable apparatus includes comparing the portion of the hand with stored images of a hand of the user of the wearable apparatus.

18. The wearable apparatus of claim 14, wherein determining whether the hand-related trigger identified in the image data is associated with at least a portion of a hand belonging to the person other than the user of the wearable apparatus includes determining an orientation of the portion of the hand.

19. The wearable apparatus of claim 14, wherein the hand-related trigger is identified by at least a portion of a hand moving in an erratic according to a predetermined motion.

20. The wearable apparatus of claim 14, wherein the hand-related trigger is identified by at least a portion of a hand configured with an index finger pointing toward an object.

21. The wearable apparatus of claim 14, wherein the confidence score is determined in part from one or more analyses of the image data including the hand-related trigger.

22. A method for selectively disregarding triggers originating from persons other than a user of a wearable apparatus, the method comprising:
capturing, via a wearable image sensor of the wearable apparatus, image data from an environment of the user of the wearable apparatus;
identifying in the image data a trigger, wherein the trigger is associated with at least one action to be performed by the wearable apparatus;
identifying in the image data at least a part of a body of a person other than the user of the wearable apparatus;
identify, in the image data, at least a part of a body of the user based on one or more characteristics of the user;
determining, based on the image data, that the trigger identified in the image data is associated with the body of the person other than the user of the wearable apparatus by determining a confidence score associated with the identified trigger, wherein the confidence score is based in part on the presence of the at least a part of the body of the user; and
forgoing performance of the at least one action if the trigger identified in the image data is determined to be associated with the body of the other person, based on the confidence score being lower than a threshold.

23. A software product stored on a non-transitory computer readable medium and comprising data and computer implementable instructions for carrying out the method of claim 22.

24. A wearable apparatus for selectively disregarding triggers originating from persons other than a user of the wearable apparatus, the wearable apparatus comprising:
a wearable image sensor configured to capture image data from an environment of the user of the wearable apparatus; and
at least one processing device programmed to:
receive the captured image data;
identify in the image data a trigger, wherein the trigger is associated with at least one action to be performed by the wearable apparatus and wherein identifying the trigger includes determining whether a potential trigger meets or exceeds a confidence threshold, the confidence threshold being based on whether a body of a person other than the user of the wearable apparatus is identified in the image data and being higher when the body of a person other the user of the wearable apparatus is identified in the image data than when no body of a person other than the user of the wearable apparatus is identified in the image data;
identify, in the image data, at least a part of a body of a person other than the user of the wearable apparatus;
determine, based on the image data, that the trigger identified in the image data is associated with the body of the person other than the user of the wearable apparatus; and
forgo performance of the at least one action if the trigger identified in the image data is determined to be associated with the body of the person other than the user of the wearable apparatus.

25. A wearable apparatus for selectively disregarding triggers originating from persons other than a user of the wearable apparatus, the wearable apparatus comprising:
a wearable image sensor configured to capture image data from an environment of the user of the wearable apparatus while being worn by the user; and
at least one processing device programmed to:
receive the captured image data;
identify in the image data a trigger, wherein the trigger is associated with at least one action to be performed by the wearable apparatus;
determine whether at least a part of a body of a person other than the user of the wearable apparatus is represented in the image data;

identify, in the image data, at least a part of a body of the user based on one or more characteristics of the user;

responsive to determining at least a part of a body of a person other than the user of the wearable apparatus is represented in the image data, determine, based on the image data, that the trigger identified in the image data is associated with the body of the person other than the user of the wearable apparatus by determining a confidence score associated with the identified trigger, wherein the confidence score is based in part on the presence of the at least a part of the body of the user; and forgo performance of the at least one action if the trigger identified in the image data is determined to be associated with the body of the other person, based on the confidence score being lower than a confidence threshold.

26. The wearable apparatus of claim 25, wherein the confidence threshold is higher when the body of a person other the user of the wearable apparatus is identified in the image data than when no body of a person other than the user of the wearable apparatus is identified in the image data.

27. The wearable apparatus of claim 25, wherein determining whether the trigger identified in the image data is associated with the body of the person other than the user of the wearable apparatus is performed when it is determined that the potential trigger meets or exceeds the confidence threshold.

* * * * *